US012521599B2

(12) United States Patent
Bae et al.

(10) Patent No.: US 12,521,599 B2
(45) Date of Patent: Jan. 13, 2026

(54) WEARABLE DEVICE FOR PROVIDING LIGHTING FUNCTION AND OPERATING METHOD THEREOF

(71) Applicant: SAMSUNG ELECTRONICS CO., LTD., Suwon-si (KR)

(72) Inventors: Soojung Bae, Suwon-si (KR); Sunae Kim, Suwon-si (KR); Mijeong Kim, Suwon-si (KR); Kiwan Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 140 days.

(21) Appl. No.: 18/591,470

(22) Filed: Feb. 29, 2024

(65) Prior Publication Data

US 2024/0198170 A1 Jun. 20, 2024

Related U.S. Application Data

(63) Continuation of application No. PCT/KR2023/014989, filed on Sep. 27, 2023.

(30) Foreign Application Priority Data

Dec. 14, 2022 (KR) ........................ 10-2022-0175064
Dec. 19, 2022 (KR) ........................ 10-2022-0177847

(51) Int. Cl.
*A63B 21/00* (2006.01)
*A63B 24/00* (2006.01)
(Continued)

(52) U.S. Cl.
CPC ........ *A63B 21/4025* (2015.10); *H02J 7/0047* (2013.01); *A63B 21/00181* (2013.01);
(Continued)

(58) Field of Classification Search
CPC .......... A63B 21/4025; A63B 21/00181; A63B 24/0062; A63B 71/0622; A63B 2230/06;
(Continued)

(56) References Cited

U.S. PATENT DOCUMENTS

2021/0121741 A1* 4/2021 Lee .................... A63B 21/4025
2021/0162263 A1* 6/2021 Roh ................... A63B 21/0059
2021/0353992 A1* 11/2021 Roh ......................... A61H 3/00

FOREIGN PATENT DOCUMENTS

JP 2009-060946 A 3/2009
JP 2015-073807 A 4/2015
(Continued)

OTHER PUBLICATIONS

PCT International Search Report dated Jan. 9, 2024 for PCT/KR2023/014989.
PCT Written Opinion dated Jan. 9, 2024 for PCT/KR2023/014989.

*Primary Examiner* — Sundhara M Ganesan
(74) *Attorney, Agent, or Firm* — Nixon & Vanderhye P.C.

(57) ABSTRACT

A wearable walking assist and/or exercise device may detect a start of exercise of the user, select LED lamps to be blinked from the plurality of LED lamps included in the lighting module based on an exercise intensity of the wearable device, determine a blinking period of the selected LED lamps based on a walking speed of the user, and blink the selected LED lamps for the determined blinking period.

20 Claims, 21 Drawing Sheets

(51) Int. Cl.
*A63B 71/06* (2006.01)
*H02J 7/00* (2006.01)

(52) U.S. Cl.
CPC ....... *A63B 24/0062* (2013.01); *A63B 71/0622* (2013.01); *A63B 2230/06* (2013.01)

(58) Field of Classification Search
CPC .......... A63B 21/0004; A63B 21/00178; A63B 21/4011; A63B 21/4047; A63B 23/03508; A63B 23/0405; A63B 24/0087; A63B 2022/0094; A63B 2024/0068; A63B 2024/0093; A63B 2220/13; A63B 2220/16; A63B 2220/30; A63B 2220/51; A63B 2225/20; A63B 2225/50; A63B 2230/00; A63B 21/0058; A63B 23/035; A63B 23/03541; A63B 21/005; A63B 23/04; A63B 2024/0065; H02J 7/0047; A61H 2201/0188; A61H 2201/1261; A61H 1/02; A61H 2201/1642; A61H 2201/165; A61H 2201/501; A61H 2201/5046; A61H 2201/5084; A61H 2201/5097; A61H 2230/045; A61H 1/0237; A61H 3/00; A61H 2201/0157; A61H 2201/1207; A61H 2201/1652; A61H 2201/5007; A61H 2201/5023; A61H 2201/5043; A61H 2201/5048; A61H 2201/5053; A61H 2201/5058; A61H 2203/0406; A61H 2230/065; B25J 9/00; B25J 9/0006
See application file for complete search history.

(56) References Cited

FOREIGN PATENT DOCUMENTS

| | | | |
|---|---|---|---|
| JP | 2015-164451 | A | 9/2015 |
| JP | 2016-518955 | A | 6/2016 |
| KR | 2008-0020162 | A | 3/2008 |
| KR | 10-2013-0084993 | A | 7/2013 |
| KR | 2015-0083331 | A | 7/2015 |
| KR | 2016-0061168 | A | 5/2016 |
| KR | 2017-0021108 | A | 2/2017 |
| KR | 2018-0096876 | A | 8/2018 |
| KR | 10-2020-0085660 | A | 7/2020 |
| KR | 10-2021-0153505 | A | 12/2021 |
| KR | 2022-0165180 | A | 12/2022 |

* cited by examiner

WEARABLE DEVICE FOR PROVIDING LIGHTING FUNCTION AND OPERATING METHOD THEREOF

CROSS-REFERENCE TO RELATED APPLICATIONS

This application is a continuation application of International Application No. PCT/KR2023/014989 designating the United States, filed on Sep. 27, 2023, in the Korean Intellectual Property Receiving Office and claiming priority to Korean Patent Application No. 10-2022-0175064, filed on Dec. 14, 2022, and to Korean Patent Application No. 10-2022-0177847, filed on Dec. 19, 2022, in the Korean Intellectual Property Office, the disclosures of which are all hereby incorporated by reference herein in their entireties.

BACKGROUND

1. Field

Certain example embodiments relate to a wearable device for providing a lighting function and/or an operating method thereof.

2. Description of Related Art

In general, a walking assistance device may refer to a mechanism or device/apparatus that helps a patient, who cannot walk or may have difficulty walking on his/her own due to various diseases, accidents, and the like, to perform walking exercises for rehabilitation treatment, and/or to a device/apparatus which may help a user exercise. With the recent intensifying aging societies, a growing number of people experience inconvenience in walking or have difficulty in normal walking due to malfunctioning joint issues, and there is increasing interest in walking assistance devices. A walking assistance device may be worn on a body of a user to assist the user with walking by providing a necessary muscular strength and to induce the user to walk in a normal walking pattern.

SUMMARY

According to an example embodiment, a wearable device to be worn on a body of a user may include: a driving module configured to generate torque to be applied to the body of the user, a leg driving frame configured to transmit the generated torque to a leg of the user, a thigh fastening portion connected, directly or indirectly, to the leg driving frame and configured to fix the leg driving frame to the leg of the user, a sensor module configured to obtain sensor data including motion information of the leg driving frame, a control module configured to control the wearable device based on the sensor data, and a lighting module configured to emit light to the outside using a plurality of light-emitting diode (LED) lamps under a control of the control module, wherein the control module may be further configured to detect a start of exercise of the user, select LED lamps to be blinked from the plurality of LED lamps included in the lighting module based on an exercise intensity of the wearable device, determine a blinking period of the selected LED lamps based on a walking speed of the user, and blink the selected LED lamps for the determined blinking period.

The example control module may be further configured to increase a number of LED lamps to be selected from the plurality of LED lamps based on an increase in the exercise intensity of the wearable device, and decrease the number of LED lamps to be selected from the plurality of LED lamps based on a decrease in the exercise intensity of the wearable device.

The example control module may be further configured to decrease the blinking period of the selected LED lamps based on an increase in the walking speed of the user, and increase the blinking period of the selected LED lamps based on a decrease in the walking speed of the user.

The plurality of LED lamps may include LED lamps disposed on a first side and LED lamps disposed on a second side opposite to the first side, wherein the control module 510 may be further configured to select first LED lamps from the LED lamps disposed on the first side and turn on and off the selected first LED lamps sequentially during the determined blinking period, and select second LED lamps from the LED lamps disposed on the second side and turn on and off the selected second LED lamps sequentially during the determined blinking period.

The example control module may be further configured to blink the selected LED lamps in a blinking color corresponding to a current exercise mode of the wearable device when a heart rate of the user falls within a stable section, and blink the selected LED lamps in a blinking color other than a blinking color corresponding to an exercise mode when the heart rate of the user falls within a risky section.

The example control module may be further configured to blink the plurality of LED lamps in a first pattern indicating a suspension of exercise of the user and iteratively blink the plurality of LED lamps in a second pattern indicating a continuation of the suspension of exercise of the user until a resumption of exercise of the user is detected after the plurality of LED lamps are blinked in the first pattern, when a suspension of exercise of the user is detected, and blink the plurality of LED lamps in a third pattern indicating a resumption of exercise of the user when a resumption of exercise of the user is detected, wherein the first pattern, the second pattern, and the third pattern may be different blinking patterns.

The example control module may be further configured to blink the plurality of LED lamps in a blinking pattern indicating a new moving direction while a change in a moving direction of the user is detected, when a change in the moving direction is detected, wherein the blinking pattern indicating the new moving direction may be a pattern that moves one or more lighting areas in which a preset number of LED lamps are turned on in the new moving direction.

The example control module may be further configured to determine a number of LED lamps to be turned on based on a ratio of a current state of charge to a battery capacity of the wearable device when charging a battery of the wearable device is initiated, and continuously turn on the determined number of LED lamps while charging the battery continues, and turn on all the plurality of LED lamps and change a lighting brightness of the plurality of LED lamps at a preset time interval, when charging the battery of the wearable device is completed.

The example control module may be further configured to transmit wearing information of the wearable device including battery information, usage information, and size information to an electronic device paired with the wearable device, when an investigation signal is received from the electronic device, and blink the plurality of LED lamps in a blinking pattern indicating a call state when a call signal is received from the electronic device.

The example control module may be further configured to determine whether a charging error occurs in the wearable device and whether a remaining usage of the wearable device is less than a threshold usage, when a management signal is received from the electronic device while charging a battery of the wearable device is performed, and represent a state of charge of a battery of the wearable device by blinking the plurality of LED lamps, when a charging error does not occur in the wearable device and the remaining usage of the wearable device is greater than or equal to the threshold usage.

According to an example embodiment, an electronic device may include a display, and a processor configured to identify one or more wearable devices paired with the electronic device, transmit an investigation signal to the identified one or more wearable devices and receive wearing information of the wearable devices including battery information, usage information, and size information from the wearable devices, and determine one wearable device to be connected with the electronic device through wireless communication among the identified one or more wearable devices based on the received wearing information.

The processor may be further configured to determine whether each of the identified one or more wearable devices satisfies a first condition regarding whether a ratio of a state of charge of a battery to a battery capacity is greater than or equal to a threshold ratio, a second condition regarding whether a remaining usage is greater than or equal to a threshold usage, and a third condition regarding whether the size of a wearable device to be worn by a user matches the size of the corresponding wearable device, and determine one of wearable devices satisfying all of the first condition, the second condition, and the third condition to be a wearable device to be connected with the electronic device through wireless communication.

According to an example embodiment, an operating method of a wearable device may include detecting, by the wearable device, a start of exercise of a user, selecting light-emitting diode (LED) lamps to be blinked from a plurality of LED lamps included in a lighting module based on an exercise intensity of the wearable device, determining a blinking period of the selected LED lamps based on a walking speed of the user, and blinking the selected LED lamps for the determined blinking period.

The selecting of the LED lamps may include increasing a number of LED lamps to be selected from the plurality of LED lamps based on an increase in the exercise intensity of the wearable device, and decreasing the number of LED lamps to be selected from the plurality of LED lamps based on a decrease in the exercise intensity of the wearable device.

The determining of the blinking period of the selected LED lamps may include decreasing the blinking period of the selected LED lamps based on an increase in the walking speed of the user, and increasing the blinking period of the selected LED lamps based on a decrease in the walking speed of the user.

The blinking of the selected LED lamps may include blinking the selected LED lamps in a blinking color corresponding to a current exercise mode of the wearable device when a heart rate of the user falls within a stable section, and blinking the selected LED lamps in a blinking color other than a blinking color corresponding to an exercise mode when the heart rate of the user falls within a risky section.

The operating method may further include blinking the plurality of LED lamps in a blinking pattern indicating a new moving direction while a change in a moving direction of the user is detected, when a change in the moving direction is detected, wherein the blinking pattern indicating the new moving direction may be a pattern that moves one or more lighting areas in which a preset number of LED lamps are turned on in the new moving direction.

The example operating method may further include determining a number of LED lamps to be turned on based on a ratio of a current state of charge of a battery to a battery capacity of the wearable device when charging a battery of the wearable device is initiated, and continuously turning on the determined number of LED lamps while charging the battery continues, and turning on all the plurality of LED lamps and changing a lighting brightness of the plurality of LED lamps at a preset time interval, when charging the battery of the wearable device is completed.

The example operating method may further include transmitting wearing information of the wearable device including battery information, usage information, and size information to an electronic device paired with the wearable device, when an investigation signal is received from the electronic device, and blinking the plurality of LED lamps in a blinking pattern indicating a call state when a call signal is received from the electronic device.

According to an example embodiment, an operating method of an electronic device may include identifying one or more wearable devices paired with the electronic device, transmitting an investigation signal to the identified one or more wearable devices and receiving wearing information of the wearable devices including battery information, usage information, and size information from the wearable devices, and determining one wearable device to be connected, directly or indirectly, with the electronic device through wireless communication among the identified one or more wearable devices based on the received wearing information.

BRIEF DESCRIPTION OF THE DRAWINGS

The above and other aspects, features, and advantages of certain example embodiments of the present disclosure will be more apparent from the following detailed description, taken in conjunction with the accompanying drawings, in which.

DETAILED DESCRIPTION

Figure 1:
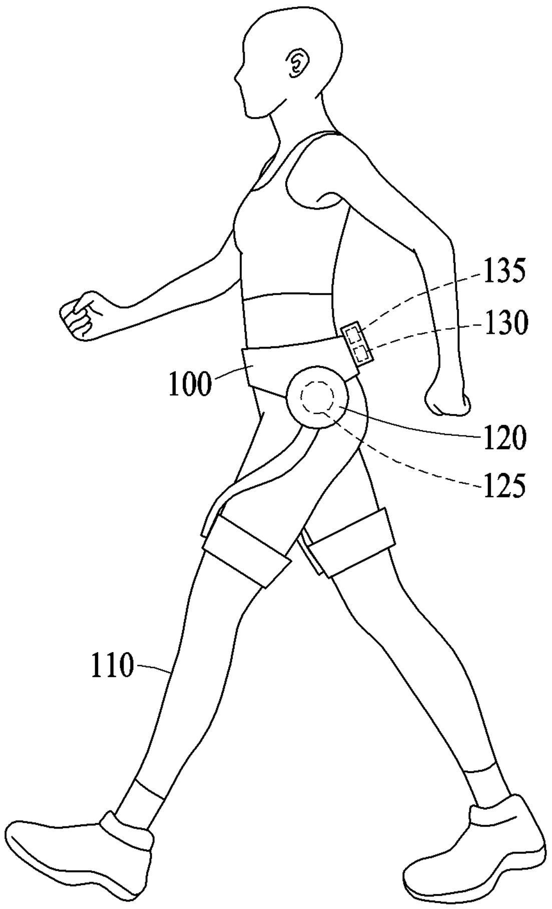
FIG. 1 illustrates an overview of a wearable device worn on a body of a user according to an example embodiment.

The following detailed structural or functional description of embodiments is provided as an example only and various alterations and modifications may be made to the embodiments. Accordingly, the embodiments are not construed as limited to the disclosure and should be understood to include all changes, equivalents, and replacements within the idea and the technical scope of the disclosure.

As used herein, the singular forms "a", "an", and "the" include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or populations thereof.

Unless otherwise defined, all terms, including technical and scientific terms, used herein have the same meaning as commonly understood by those having ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, embodiments will be described in detail with reference to the accompanying drawings. When describing the embodiments with reference to the accompanying drawings, like reference numerals refer to like elements and a repeated description related thereto will be omitted.

FIG. 1 is a diagram illustrating an overview of a wearable device worn on a body of a user according to an embodiment.

Referring to FIG. 1, in an embodiment, a wearable device 100 may be a device worn on a body of a user 110 to assist the user 110 in walking, exercising, and/or working. In an embodiment, the wearable device 100 may be used to measure a physical ability (e.g., a walking ability, an exercise ability, or an exercise posture) of the user 110. In embodiments, the term "wearable device" may be replaced with "wearable robot," "walking assistance device," or "exercise assistance device". The user 110 may be a human or an animal, but is not limited thereto. The wearable device 100 may be worn on a body (e.g., a lower body (the legs, ankles, knees, etc.), an upper body (the torso, arms, wrists, etc.), or the waist) of the user 110 to apply an external force such as an assistance force and/or a resistance force to a body motion of the user 110. The assistance force may be a force applied in the same direction as the body motion direction of the user 110, the force to assist a body motion of the user 110. The resistance force may be a force applied in a direction opposite to the body motion direction of the user 110, the force hindering a body motion of the user 110. The term "resistance force" may also be referred to as "exercise load".

In an embodiment, the wearable device 100 may operate in a walking assistance mode for assisting the user 110 in walking. In the walking assistance mode, the wearable device 100 may assist the user 110 in walking by applying an assistance force generated by a driving module 120 of the wearable device 100 to the body of the user 110. The wearable device 100 may allow the user 110 to walk independently or to walk for a long time by providing a force required for walking of the user 110, to expand a walking ability of the user 110. The wearable device 100 may help in improving an abnormal walking habit or walking posture of a walker.

In an embodiment, the wearable device 100 may operate in an exercise assistance mode for enhancing the exercise effect of the user 110. In the exercise assistance mode, the wearable device 100 may hinder a body motion of the user 110 or provide resistance to a body motion of the user 110 by applying a resistance force generated by the driving module 120 to the body of the user 110. When the wearable device 100 is a hip-type wearable device that is worn on the waist (or pelvis) and legs (e.g., thighs) of the user 110, the wearable device 100 may provide an exercise load to a leg motion of the user 110 while being worn on the legs, thereby enhancing the exercise effect on the legs of the user 110. In an embodiment, the wearable device 100 may apply an assistance force to the body of the user 110 to assist the user 110 in exercising. For example, when a handicapped person or an elderly person wants to exercise wearing the wearable device 100, the wearable device 100 may provide an assistance force for assisting a body motion during the exercise process. In an embodiment, the wearable device 100 may provide an assistance force and a resistance force in combination for each exercise section or time section, in such a manner of providing an assistance force in some exercise sections and a resistance force in other exercise sections.

In an embodiment, the wearable device 100 may operate in a physical ability measurement mode for measuring a physical ability of the user 110. The wearable device 100 may measure motion information of a user using sensors (e.g., an angle sensor 125 and an inertial measurement unit (IMU) 135) provided in the wearable device 100 while the user is walking or exercising, and evaluate the physical ability of the user based on the measured motion information. For example, a gait index or an exercise ability indicator (e.g., the muscular strength, endurance, balance, or exercise posture) of the user 110 may be estimated through the motion information of the user 110 measured by the wearable device 100. The physical ability measurement mode may include an exercise posture measurement mode for measuring an exercise posture of a user.

In various embodiments, for convenience of description, the wearable device 100 is described as an example of a hip-type wearable device, as illustrated in FIG. 1, but the embodiments are not limited thereto. As described above, the wearable device 100 may be worn on another body part (e.g., the upper arms, lower arms, hands, calves, and feet) other than the waist and legs (particularly, the thighs), and the shape and configuration of the wearable device 100 may vary depending on the body part on which the wearable device 100 is worn.

Figure 3:
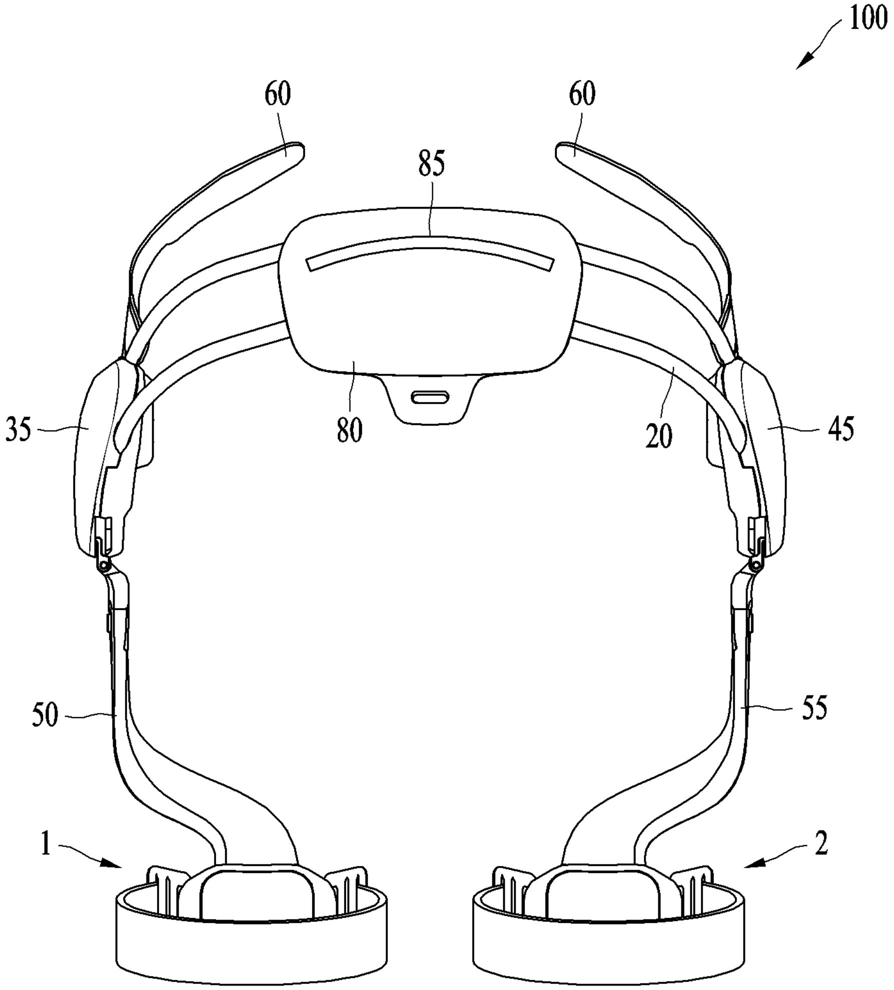
FIG. 3 is a rear schematic view illustrating a wearable device according to an example embodiment.

According to an embodiment, the wearable device 100 may include a support frame (e.g., a waist support frame 20, an example of which is shown in FIG. 3) configured to support the body of the user 110 when the wearable device 100 is worn on the body of the user 110, the driving module 120 (e.g., driving modules 35 and 45 of FIG. 3) configured to generate torque to be applied to the legs of the user 110, a leg driving frame (e.g., leg driving frames 50 and 55 of FIG. 3) configured to transmit the torque generated by the driving module 120 to the legs of the user 110, a sensor module (e.g., a sensor module 520 of FIG. 5A) including one or more sensors configured to obtain sensor data including motion information about a body motion (e.g., a leg motion and an upper body motion) of the user 110, and a control module 130 (e.g., a control module 510 of FIGS. 5A and 5B) configured to control the wearable device 100. Each "driving module" or "drive module" herein may comprise a motor and/or circuitry, as shown in FIG. 5B for example.

The sensor module may include the angle sensor 125 and the IMU 135. The angle sensor 125 may measure the rotational angle of a leg driving frame of the wearable device 100 corresponding to the hip joint angle value of the user 110. The rotational angle of the leg driving frame measured by the angle sensor 125 may be estimated as the hip joint angle value (or leg angle value) of the user 110. The angle sensor 125 may include, for example, an encoder and/or a Hall sensor. In an embodiment, the angle sensor 125 may be disposed in a vicinity where a motor included in the driving module 120 is connected, directly or indirectly, to the leg drive frame. The IMU 135 may include an acceleration sensor and/or an angular velocity sensor, and may measure a change in acceleration and/or angular velocity according to a motion of the user 110. The IMU 135 may measure a motion value of, for example, a waist support frame or a base body (e.g., a base body 80 of FIG. 3) of the wearable device 100. The motion value of the waist support frame or the base body measured by the IMU 135 may be estimated as the upper body motion value of the user 110.

In an embodiment, the control module 130 and the IMU 135 may be arranged within the base body (e.g., the base body 80 of FIG. 3) of the wearable device 100. The base body may be positioned on the lumbar region (an area of the lower back) of the user 110 while the user 110 is wearing the wearable device 100. The base body may be formed or attached to the outer side of the waist support frame of the wearable device 100.

Figure 2:
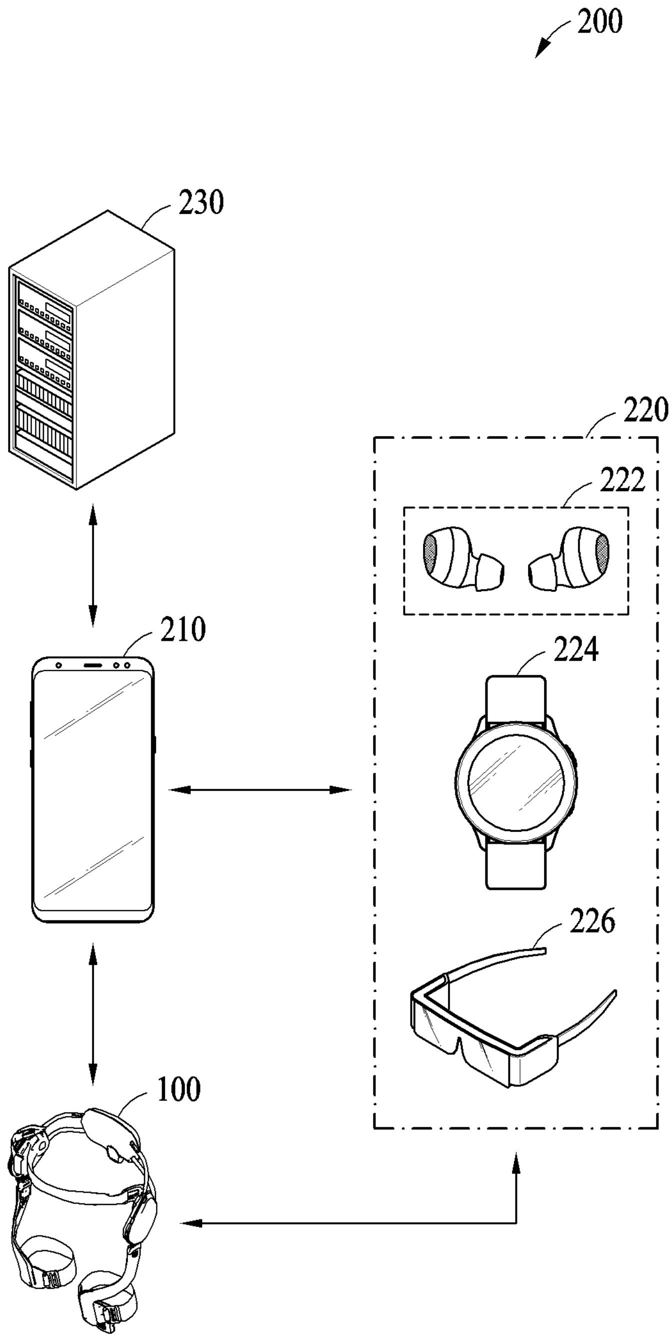
FIG. 2 is a diagram illustrating a management system including a wearable device and an electronic device according to an example embodiment.

FIG. 2 is a diagram illustrating a management system including a wearable device and an electronic device according to an embodiment.

Referring to FIG. 2, a management system 200 may include the wearable device 100, an electronic device 210, another wearable device 220, and a server 230. In an embodiment, at least one (e.g., the other wearable device 220 or the server 230) of these devices may be omitted from the management system 200, or one or more other devices (e.g., an exclusive controller device for the wearable device 100) may be added to the management system 200.

In an embodiment, the wearable device 100 may be worn on a body of the user in the walking assistance mode to assist a motion of the user. For example, the wearable device 100 may be worn on the legs of the user to help the user in walking by generating an assistance force for assisting a leg motion of the user.

In an embodiment, the wearable device 100 may generate a resistance force for hindering a body motion of the user or an assistance force for assisting a body motion of the user and apply the generated resistance force or assistance force to the body of the user to enhance the exercise effect of the user in an exercise assistance mode. In the exercise assistance mode, the user may select, through the electronic device 210, an exercise program (e.g., squat, split lunge, dumbbell squat, lunge and knee up, stretching, or the like) to perform using the wearable device 100 and/or an exercise intensity to be applied to the wearable device 100. The wearable device 100 may control a driving module of the wearable device 100 according to the exercise program selected by the user and obtain sensor data including motion information of the user through a sensor module. The wearable device 100 may adjust the strength of the resistance force or assistance force applied to the user according to the exercise intensity selected by the user. For example, the wearable device 100 may control the driving module to generate a resistance force corresponding to the exercise intensity selected by the user.

In an embodiment, the wearable device 100 may be used to measure a physical ability of the user by interworking with the electronic device 210. The wearable device 100 may operate in a physical ability measurement mode, which is a mode for measuring a physical ability of the user, under the control of the electronic device 210, and may transmit sensor data obtained by a motion of the user in the physical ability measurement mode to the electronic device 210. The electronic device 210 may evaluate the physical ability of the user by analyzing the sensor data received from the wearable device 100.

The electronic device 210 may communicate with the wearable device 100 and may remotely control the wearable device 100 or provide the user with state information about a state (e.g., a booting state, a charging state, a sensing state, or an error state) of the wearable device 100. The electronic device 210 may receive the sensor data obtained by the sensor module in the wearable device 100 from the wearable device 100 and estimate the physical ability of the user or an exercise result based on the received sensor data. The electronic device 210 may provide the user with the physical ability of the user or the exercise result through a graphical user interface (GUI).

In an embodiment, the user may execute a program (e.g., an application) in the electronic device 210 to control the wearable device 100, and the user may adjust an operation or a set value of the wearable device 100 (e.g., the intensity of torque output from a driving module (e.g., the driving modules 35 and 45 of FIG. 3), the volume of audio output from a sound output module (e.g., a sound output module 550 of FIGS. 5A and 5B), or the brightness of a lighting module (e.g., a lighting module 85 of FIG. 3) through the corresponding program. The program executed by the electronic device 210 may provide a GUI for interaction with the user. The electronic device 210 may include various types of devices. For example, the electronic device 210 may include a portable communication device (e.g., a smart phone), a computer device, an access point, a portable multimedia device, or a home appliance (e.g., a television, an audio device, or a projector device), but is not limited thereto.

According to an embodiment, the electronic device 210 may be connected, directly or indirectly, to the server 230 using short-range wireless communication or cellular communication. The server 230 may receive user profile information of the user who uses the wearable device 100 from the electronic device 210 and store and manage the received user profile information. The user profile information may include, for example, information about at least one of the name, age, gender, height, weight, or body mass index (BMI). The server 230 may receive exercise history information about an exercise performed by the user from the electronic device 210 and store and manage the received exercise history information. The server 230 may provide the electronic device 210 with various exercise programs or physical ability measurement programs that may be provided to the user.

According to an embodiment, the wearable device 100 and/or the electronic device 210 may be connected to the other wearable device 220. The other wearable device 220 may include, for example, wireless earphones 222, a smart watch 224, or smart glasses 226, but is not limited thereto. In an embodiment, the smart watch 224 may measure a biosignal including heart rate information of the user and transmit the measured biosignal to the electronic device 210 and/or the wearable device 100. The electronic device 210 may estimate the heart rate information (e.g., the current heart rate, maximum heart rate, and average heart rate) of the user based on the biosignal received from the smart watch 224 and provide the estimated heart rate information to the user.

In an embodiment, the exercise result information, physical ability information, and/or exercise posture evaluation information determined by the electronic device 210 may be transmitted to the other wearable device 220 and provided to the user through the other wearable device 220. State information of the wearable device 100 may also be transmitted to the other wearable device 220 and provided to the user through the other wearable device 220. In an embodiment, the wearable device 100, the electronic device 210, and the other wearable device 220 may be connected to each other through wireless communication (e.g., Bluetooth communication or Wi-Fi communication).

In an embodiment, the wearable device 100 may provide (or output) feedback (e.g., visual feedback, auditory feedback, or haptic feedback) corresponding to the state of the wearable device 100 according to the control signal received from the electronic device 210. For example, the wearable device 100 may provide visual feedback through the lighting module (e.g., the lighting module 85 of FIG. 3) and provide auditory feedback through the sound output module (e.g., the sound output module 550 of FIGS. 5A and 5B).

Figure 4:
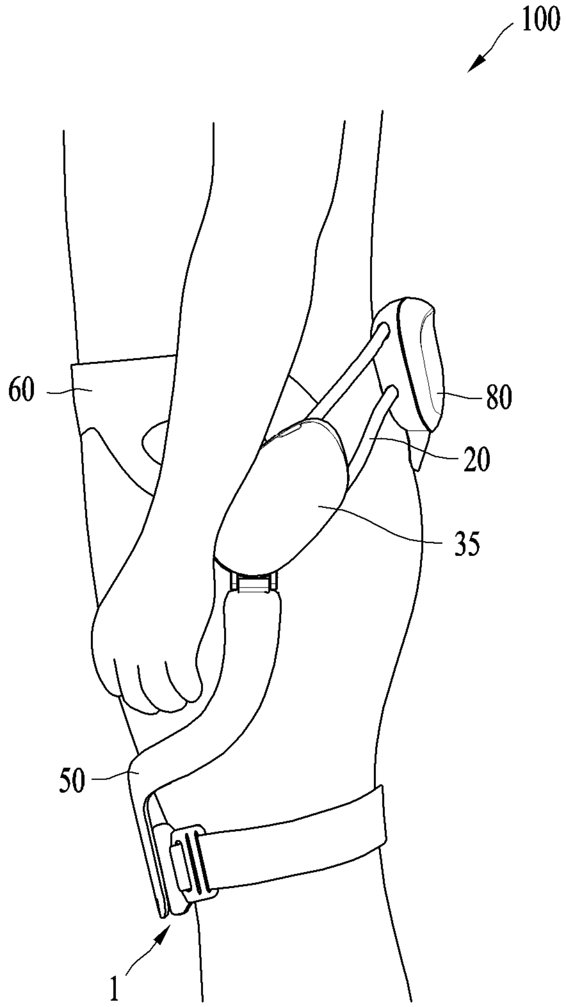
FIG. 4 is a left side view illustrating a wearable device according to an example embodiment.

FIG. 3 is a rear schematic diagram illustrating a wearable device according to an embodiment. FIG. 4 is a left side view illustrating the wearable device according to an embodiment.

Referring to FIGS. 3 and 4, the wearable device 100 according to an embodiment may include the base body 80, the waist support frame 20, the driving modules 35 and 45, the leg driving frames 50 and 55, thigh fastening portions 1 and 2, and a waist fastening portion 60. The base body 80 may include the lighting module 85.

The base body 80 may be positioned on the lumbar region of a user while the user is wearing the wearable device 100. The base body 80 may be mounted on the lumbar region of the user to provide a cushioning feeling to the lower back of the user and may support the lower back of the user. The base body 80 may be hung on the hip region (an area of the hips) to prevent or reduce a chance of the wearable device 100 from being separated downward due to gravity while the user is wearing the wearable device 100. The base body 80 may distribute a portion of the weight of the wearable device 100 to the lower back of the user while the user is wearing the wearable device 100. The base body 80 may be connected, directly or indirectly, to the waist support frame 20. Waist support frame connecting elements (not shown) to be connected, directly or indirectly, to the waist support frame 20 may be provided at both end portions of the base body 80.

In an embodiment, the lighting module 85 may be disposed on the outer surface of the base body 80. The lighting module 85 may include a light source (e.g., a light-emitting diode (LED)). The lighting module 85 may emit light under the control of a processor (not shown) (e.g., a processor 512 of FIGS. 5A and 5B). In some embodiments, the processor may control the lighting module 85 to provide (or output) visual feedback corresponding to the state of the wearable apparatus 100 through the lighting module 85.

The waist support frame 20 may support a body part (e.g., the waist) of the user when the wearable device 100 is worn on the body of the user. The waist support frame 20 may extend from both end portions of the base body 80. The lumbar region of the user may be accommodated inside the waist support frame 20. The waist support frame 20 may include at least one rigid body beam. Each beam may be in a curved shape having a preset curvature to enclose the lumbar region of the user. The waist fastening portion 60 may be connected, directly or indirectly, to an end portion of the waist support frame 20. The driving modules 35 and 45 may be connected, directly or indirectly, to the waist support frame 20.

In an embodiment, a processor, a memory, an IMU (e.g., the IMU 135 of FIG. 1 or an IMU 522 of FIG. 5B), a communication module (e.g., a communication module 516 of FIGS. 5A and 5B), a sound output module (e.g., the sound output module 550 of FIGS. 5A and 5B), and a battery (not shown) may be disposed in the base body 80. The base body 80 may protect the components disposed therein. The processor may generate a control signal for controlling the operation of the wearable device 100. The processor may control actuators of the driving modules 35 and 45. The processor and the memory may be included in a control circuit. The control circuit may further include a power supply circuit configured to supply power from the battery to each of the components of the wearable device 100.

In an embodiment, the wearable device 100 may include a sensor module (not shown) (e.g., the sensor module 520 of FIG. 5A) configured to obtain sensor data from at least one sensor. The sensor module may obtain sensor data including motion information of the user and/or motion information of the components of the wearable device 100. The sensor module may include, for example, an IMU (e.g., the IMU 135 of FIG. 1 or the IMU 522 of FIG. 5B) configured to measure an upper body motion value of the user or a motion value of the waist support frame 20 and an angle sensor (e.g., the angle sensor 125 of FIG. 1 or a first angle sensor 524 and a second angle sensor 524-1 of FIG. 5B) configured to measure a hip joint angle value of the user or a motion value of the leg driving frames 50 and 55, but is not limited thereto. For example, the sensor module may further include at least one of a position sensor, a temperature sensor, a biosignal sensor, or a proximity sensor.

The waist fastening portion 60 may be connected, directly or indirectly, to the waist support frame 20 to fasten the waist support frame 20 to the waist of the user. The waist fastening portion 60 may include, for example, a pair of belts.

The driving modules 35 and 45 may generate an external force (or torque) to be applied to the body of the user based on the control signal generated by the processor. For example, the driving modules 35 and 45 may generate an assistance force or resistance force to be applied to the legs of the user. In an embodiment, the driving modules 35 and 45 may include a first driving module 45 disposed in a position corresponding to a position of a right hip joint of the user, and a second driving module 35 disposed in a position corresponding to a position of a left hip joint of the user. The first driving module 45 may include a first actuator and a first joint member, and the second driving module 35 may include a second actuator and a second joint member. The first actuator may provide power to be transmitted to the first joint member, and the second actuator may provide power to be transmitted to the second joint member. The first actuator and the second actuator may each include a motor (e.g., motors 534 and 534-1 of FIG. 5B) configured to generate power (or torque) by receiving power from a battery. When the motor is supplied with electric power and driven, the motor may generate a force (an assistance force) for assisting a body motion of the user or a force (a resistance force) for hindering a body motion of the user. In an embodiment, the control module may adjust the strength and direction of the force generated by the motor by adjusting the voltage and/or current supplied to the motor.

In an embodiment, the first joint member and the second joint member may receive power from the first actuator and the second actuator, respectively, and may apply an external force to the body of the user based on the received power. The first joint member and the second joint member may be arranged at positions corresponding to the joints of the user, respectively. One side of the first joint member may be connected, directly or indirectly, to the first actuator, and the other side of the first joint member may be connected, directly or indirectly, to a first leg driving frame 55. The first joint member may be rotated by the power received from the first actuator. An encoder or a Hall sensor that may operate as an angle sensor to measure a rotation angle (corresponding to a joint angle of the user) of the first joint member or the first leg driving frame 55 may be disposed on one side of the first joint member. One side of the second joint member may be connected to the second actuator, and the other side of the second joint member may be connected to a second leg driving frame 50. The second joint member may be rotated by the power received from the second actuator. An encoder or a hall sensor that may operate as an angle sensor to measure a rotation angle of the second joint member or the second leg driving frame 50 may be disposed on one side of the second joint member.

In an embodiment, the first actuator may be arranged in a lateral direction of the first joint member, and the second actuator may be arranged in a lateral direction of the second joint member. A rotation axis of the first actuator and a rotation axis of the first joint member may be spaced apart from each other, and a rotation axis of the second actuator and a rotation axis of the second joint member may also be spaced apart from each other. However, embodiments are not limited thereto, and an actuator and a joint member may share a rotation axis. In an embodiment, each actuator may be spaced apart from a corresponding joint member. In this case, each of the driving modules 35 and 45 may further include a power transmission module (not shown) configured to transmit power from the actuator to the joint member. The power transmission module may be a rotary body, such as a gear, or a longitudinal member, such as a wire, a cable, a string, a spring, a belt, or a chain. However, the scope of the embodiment is not limited by the positional relationship between an actuator and a joint member and the power transmission structure described above.

In an embodiment, the leg driving frames 50 and 55 may transmit torque generated by the driving modules 35 and 45 to the body (e.g., the legs) of the user when the wearable device 100 is worn on the legs of the user. The transmitted torque may act as an external force applied to the motions of the legs of the user. As one end portions of the leg driving frames 50 and 55 are connected to the joint members to rotate and the other end portions of the leg driving frames 50 and 55 are connected to the thigh fastening portions 1 and 2, the leg driving frames 50 and 55 may transmit the torque generated by the driving modules 35 and 45 to the thighs of the user while supporting the thighs of the user. For example, the leg driving frames 50 and 55 may push or pull the thighs of the user. The leg driving frames 50 and 55 may extend in the longitudinal direction of the thighs of the user. The leg driving frames 50 and 55 may be bent to surround at least a portion of the circumference of the thighs of the user. The leg driving frames 50 and 55 may include the first leg driving frame 55 configured to transmit torque to the right leg of the user and the second leg driving frame 50 configured to transmit torque to the left leg of the user.

The thigh fastening portions 1 and 2 may be connected, directly or indirectly, to the leg driving frames 50 and 55 and may fasten the wearable device 100 to the legs (in particular, the thighs) of the user. For example, the thigh fastening portions 1 and 2 may include a first thigh fastening portion 2 configured to fasten the wearable device 100 to the right thigh of the user and a second thigh fastening portion 1 configured to fasten the wearable device 100 to the left thigh of the user.

In an embodiment, the first thigh fastening portion 2 may include a first cover, a first fastening frame/support, and a first strap, and the second thigh fastening portion 1 may include a second cover, a second fastening frame/support, and a second strap. In an embodiment, the first cover and the second cover may apply torques generated by the driving modules 35 and 45 to the thighs of the user. For example, the first cover and the second cover may be arranged on one sides of the thighs of the user to push or pull the thigh of the user. The first cover and the second cover may be arranged on the front surfaces of the thighs of the user. The first cover and the second cover may be arranged in the circumferential directions of the thighs of the user. The first cover and the second cover may extend to both sides from the other end portions of the leg driving frames 50 and 55 and may include curved surfaces corresponding to the thighs of the user. One end of the first cover and the second cover may be connected, directly or indirectly, to the fastening frames, and the other ends thereof may be connected, directly or indirectly, to the straps.

The first fastening frame and the second fastening frame may be arranged, for example, to surround at least some portions of the circumferences of the thighs of the user, thereby preventing or reducing a chance of the thigh(s) of the user from being separated from the wearable device 100. The first fastening frame may have a fastening structure that connects the first cover and the first strap, and the second fastening frame may have a fastening structure that connects the second cover and the second strap.

The first strap may enclose the remaining portion of the circumference of the right thigh of the user that is not covered by the first cover and the first fastening frame, and the second strap may enclose the remaining portion of the circumference of the left thigh of the user that is not covered by the second cover and the second fastening frame. The first strap and the second strap may include, for example, an elastic material (e.g., a band).

Figure 5A:
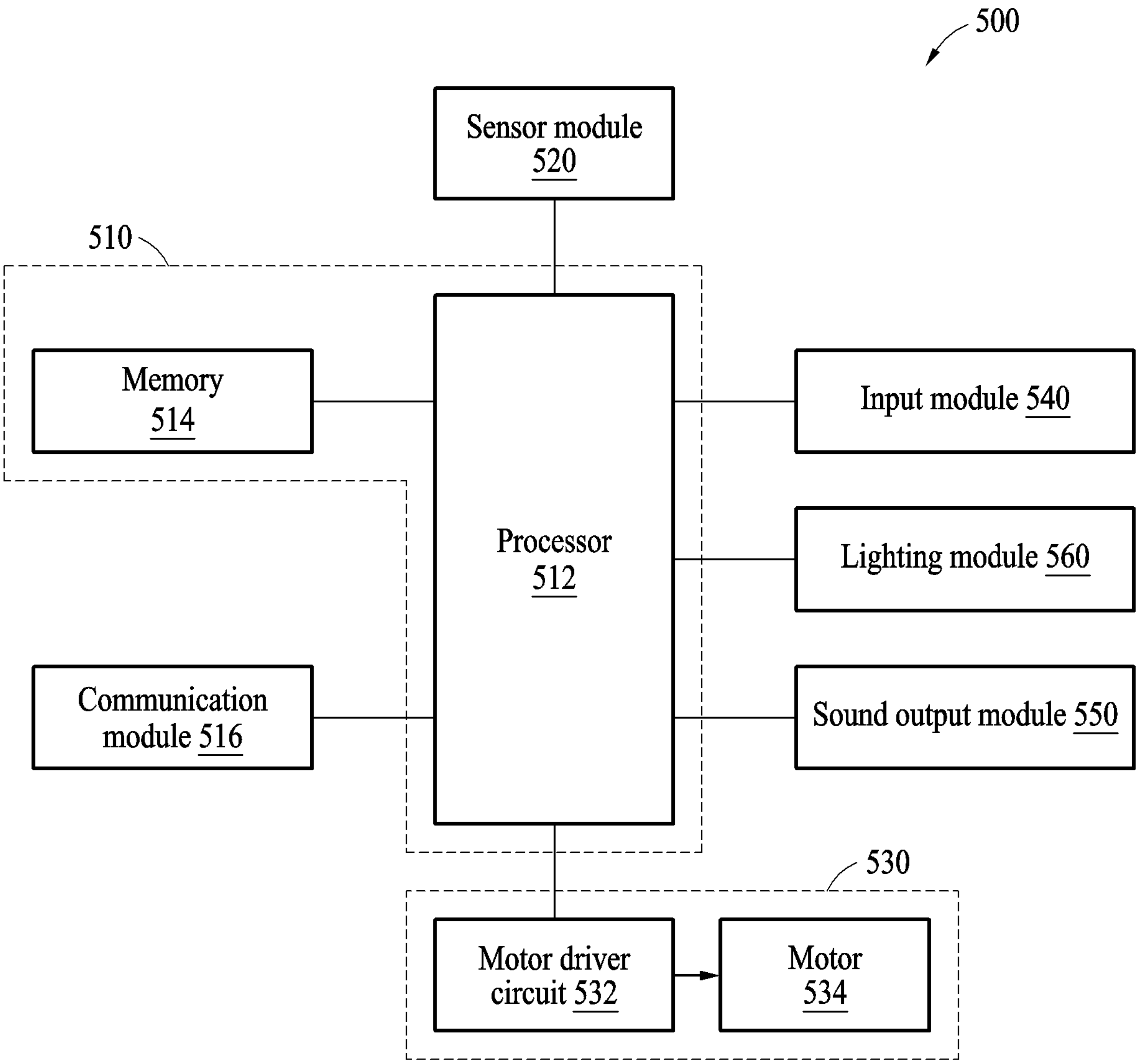
FIGS. 5A and 5B are diagrams illustrating a configuration of a control system of a wearable device according to an example embodiment.
Figure 5B:
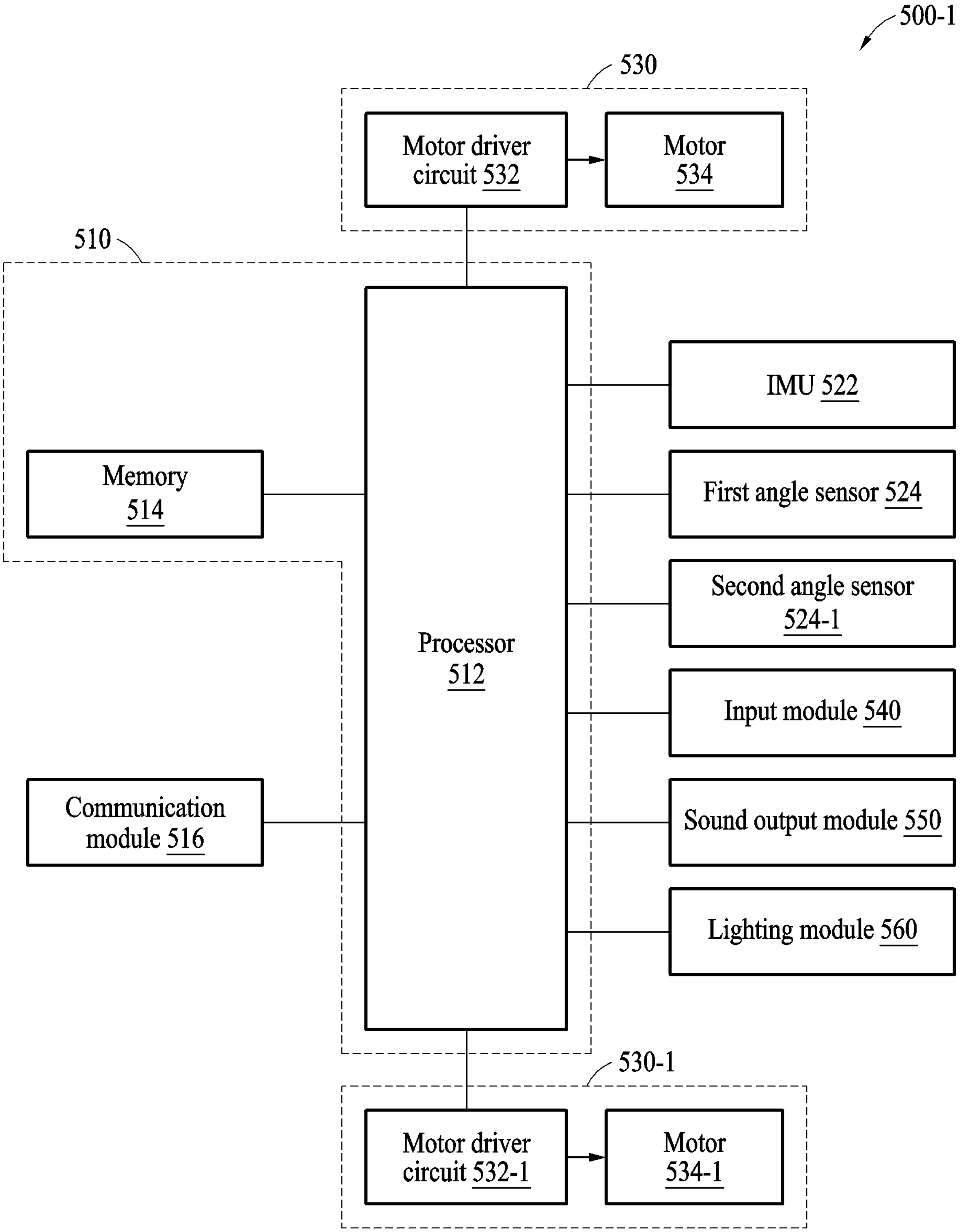

FIGS. 5A and 5B are diagrams illustrating a configuration of a control system of a wearable device according to an embodiment.

Referring to FIG. 5A, a wearable device (e.g., the wearable device 100) may be controlled by a control system 500. The control system 500 may include the control module 510, the communication module 516, the sensor module 520, a driving module 530, an input module 540, the sound output module 550, and a lighting module 560. The driving module 530 may include a motor 534 configured to generate power (e.g., a torque) and a motor driver circuit 532 configured to drive the motor 534. Although FIG. 5A illustrates the driving module 530 including one motor driver circuit 532 and one motor 534, the example of FIG. 5A is merely an example. Referring to FIG. 5B, a control system 500-1 may include a plurality (two or more) of motor driver circuits (e.g., motor driver circuits 532 and 532-1) and motors (e.g., the motors 534 and 534-1). The driving module 530 including the motor driver circuit 532 and the motor 534 may correspond to the first driving module 45 of FIG. 3, and a driving module 530-1 including the motor driver circuit 532-1 and the motor 534-1 may correspond to the second driving module 35 of FIG. 3. The following descriptions of the motor driver circuit 532 and the motor 534 may also be respectively applicable to the motor driver circuit 532-1 and the motor 534-1 illustrated in FIG. 5B.

Referring back to FIG. 5A, the sensor module 520 may include at least one sensor. The sensor module 520 may generate sensor data including motion information of a user or motion information of the wearable device. The sensor module 520 may transmit the obtained sensor data to the control module 510. The sensor module 520 may include the IMU 522 and an angle sensor (e.g., a first angle sensor 524 and a second angle sensor 524-1) as illustrated in FIG. 5B. The IMU 522 may measure an upper body motion value of the user. For example, the IMU 522 may sense acceleration and angular velocity of an X-axis, a Y-axis, and a Z-axis according to a motion of the user. In addition, the IMU 522 may obtain a motion value (e.g., an acceleration value and an angular velocity value) of a waist support frame of the wearable device. The angle sensor may measure a hip joint angle value according to a motion of a leg of the user. Sensor data that may be measured by the angle sensor may include, for example, a hip joint angle value of a right leg, a hip joint angle value of a left leg, and information on a motion direction of a leg. The first angle sensor 524 of FIG. 5B may obtain the hip joint angle value of the right leg of the user and the second angle sensor 524-1 may obtain the hip joint angle value of the left leg of the user. The first angle sensor 524 and the second angle sensor 524-1 may each include, for example, an encoder and/or a hall sensor. In addition, the first and second angle sensors 524 and 524-1 may obtain a motion value of a leg driving frame of the wearable device. For example, the first angle sensor 524 may obtain a motion value of the first leg driving frame 55 and the second angle sensor 524-1 may obtain a motion value of the second leg driving frame 50 (e.g., see FIGS. 3 and 5B).

In an embodiment, the sensor module 520 may further include a position sensor, a proximity sensor, a biosignal sensor, and a temperature sensor, in which the position sensor may obtain a position value of the wearable device, the proximity sensor may detect the proximity of an object, the biosignal sensor may detect a biosignal of the user, and the temperature sensor may sense an ambient temperature.

The input module 540 may receive a command or data to be used by another component (e.g., a processor 512) of the wearable device from the outside (e.g., the user) of the wearable device. The input module 540 may include, for example, a key (e.g., a button) or a touch screen.

The sound output module 550 may output a sound signal to the outside of the wearable device. The sound output module 550 may include a guide sound signal (e.g., a driving start sound or an operation error notification sound) and a speaker for playing music content or a guide voice.

The lighting module 560 may emit light to the outside under the control of the processor 512. The lighting module 560 may include a light source (e.g., an LED lamp) configured to emit light. The lighting module 560 may include a plurality of LED lamps. Each LED lamp may include red, green, and blue LEDs, and each LED lamp may emit light of a desired color by combining the light emitted from the red LED, the light emitted from the green LED, and the light emitted from the blue LED. Also, there may be a plurality of lighting modules 560, and the wearable device 100 may include, for example, a front lighting module and a rear lighting module. The lighting module (e.g., the lighting module 85 of FIG. 3) disposed on the outer surface of the base body 80 may be the rear lighting module, and the lighting module (not shown) disposed on the outer surface of each of the driving modules 35 and 45 may be the front lighting module.

In an embodiment, the control system 500 may further include a battery (not shown) to supply power to each component of the wearable device. The wearable device may convert the power of the battery into power suitable for an operating voltage of each component of the wearable device and supply the converted power to each component.

The driving module 530 may generate an external force to be applied to the leg of the user by control of the control module 510. The driving module 530 may be in a position corresponding to a position of a hip joint of the user and may generate torque to be applied to the leg of the user based on a control signal generated by the control module 510. The control module 510 may transmit the control signal to the motor driver circuit 532, and the motor driver circuit 532 may control an operation of the motor 534 by generating a current signal (or a voltage signal) corresponding to the control signal and supplying the current signal (or the voltage signal) to the motor 534. The current signal may not be supplied to the motor 534 according to the control signal. When the current signal is supplied to the motor 534, and the motor is driven, the motor 534 may generate a force to assist a leg motion of the user or torque to impede the leg motion of the user.

The control module 510 may control an overall operation of the wearable device and may generate a control signal to control each component (e.g., the driving module 530). The control module 510 may include a processor 512 and a memory 514.

The processor 512 may execute, for example, software to control at least one other component (e.g., a hardware or software component) of the wearable device connected to the processor 512 and may perform various types of data processing or operations. According to an embodiment, as at least a part of data processing or computation, the processor 512 may store instructions or data received from another component (e.g., the communication module 516) in the memory 514, may process the instructions or the data stored in the memory 514, and may store result data in the memory 514. According to an embodiment, the processor 512 may include a main processor (e.g., a central processing unit (CPU) or an application processor (AP)) or an auxiliary processor (e.g., a graphics processing unit (GPU), a neural processing unit (NPU), an image signal processor (ISP), a sensor hub processor, or a communication processor (CP)) that is operable independently of, or in conjunction with the main processor. The auxiliary processor may be implemented separately from the main processor or as a part of the main processor.

The memory 514 may store a variety of data used by at least one component (e.g., the processor 512) of the control module 510. The data may include, for example, software, sensor data, and input data or output data for instructions related thereto. The memory 514 may include a volatile memory or a non-volatile memory (e.g., a random-access memory (RAM), a dynamic RAM (DRAM), or a static RAM (SRAM)).

The communication module 516 may support establishing a direct (e.g., wired) communication channel or a wireless communication channel between the control module 510 and another component of the wearable device or an external electronic device (e.g., the electronic device 210 or the other wearable device 220 of FIG. 2), and performing communication via the established communication channel. For example, the communication module 516 may transmit the sensor data obtained by the sensor module 520 to an external electronic device (e.g., the electronic device 210 of FIG. 2) and receive a control signal from the electronic device. The communication module 516 may include one or more CPs that are operable independently of the processor 512 and that support a direct (e.g., wired) communication or a wireless communication. According to an embodiment, the communication module 516 may include a wireless communication module (e.g., a cellular communication module, a short-range wireless communication module, or a global navigation satellite system (GNSS) communication module), and/or a wired communication module. A corresponding one of these communication modules may communicate with another component of the wearable device and/or an external electronic device via a short-range communication network, such as Bluetooth™, wireless-fidelity (Wi-Fi), an Adaptive Network Topology (ANT) or infrared data association (IrDA), or a long-range communication network, such as a legacy cellular network, a 5G network, a next-generation communication network, the Internet, or a computer network (e.g., a local area network (LAN) or a wide region network (WAN)).

Figure 6:
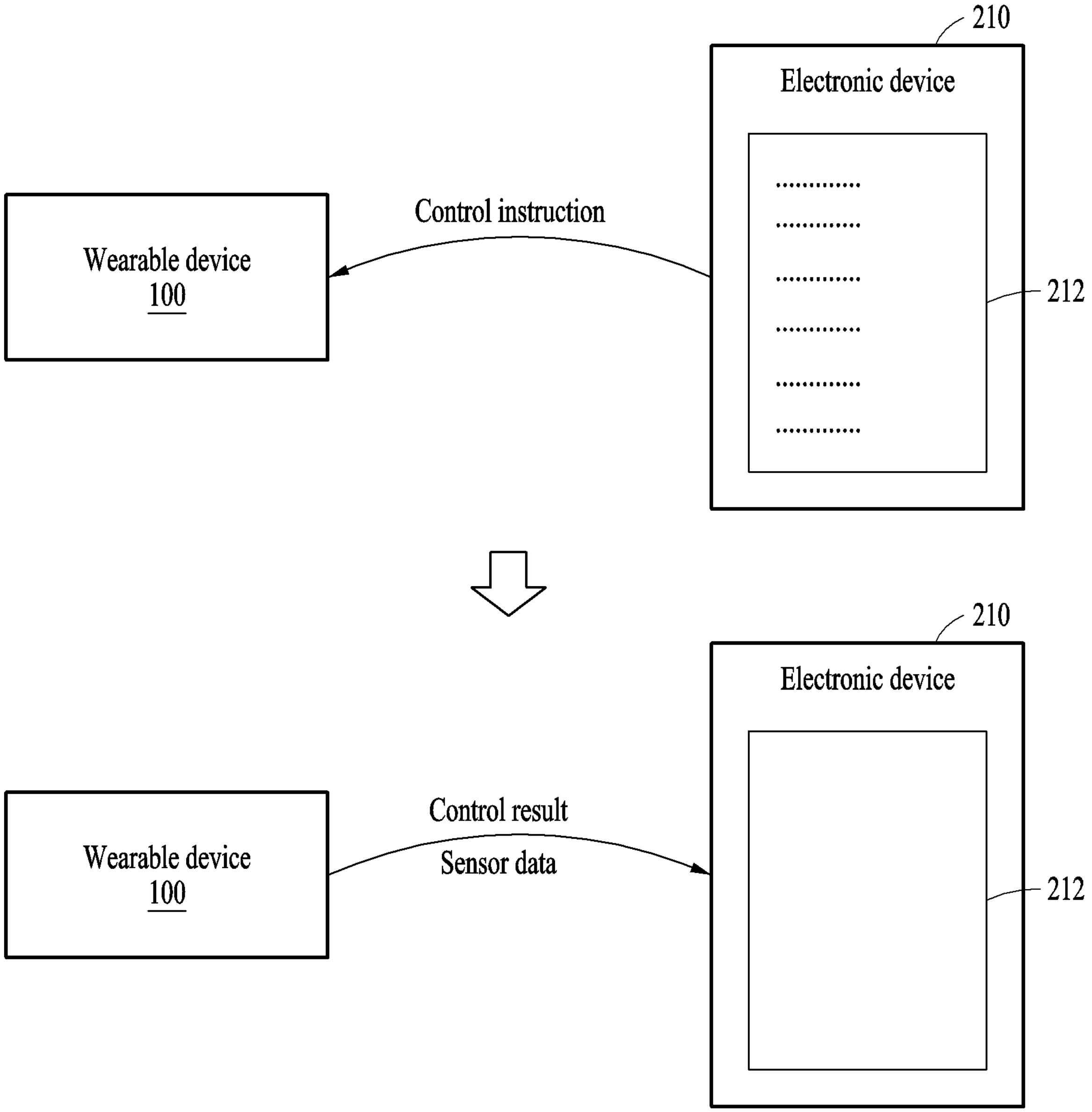
FIG. 6 is a diagram illustrating an interaction between a wearable device and an electronic device according to an example embodiment.

FIG. 6 is a diagram illustrating an interaction between a wearable device and an electronic device according to an embodiment.

Referring to FIG. 6, the wearable device 100 may communicate with the electronic device 210. For example, the electronic device 210 may be a user terminal of a user using the wearable device 100 or a controller device dedicated to the wearable device 100. In an embodiment, the wearable device 100 and the electronic device 210 may be connected to each other through short-range wireless communication (e.g., Bluetooth™ or Wi-Fi communication).

In an embodiment, the electronic device 210 may check a state of the wearable device 100 or execute an application to control or operate the wearable device 100. A screen of a user interface (UI) may be displayed to control an operation of the wearable device 100 or determine an operation mode of the wearable device 100 on a display 212 of the electronic device 210 through the execution of the application. The UI may be, for example, a GUI.

In an embodiment, the user may input an instruction for controlling the operation of the wearable device 100 (e.g., an execution instruction to a walking assistance mode, an exercise assistance mode, or a physical ability measurement mode) or change settings of the wearable device 100 through a GUI screen on the display 212 of the electronic device 210. The electronic device 210 may generate a control instruction (or control signal) corresponding to an operation control instruction or a setting change instruction input by the user and transmit the generated control instruction to the wearable device 100. The wearable device 100 may operate according to the received control instruction and transmit a control result according to the control instruction and/or sensor data measured by the sensor module of the wearable device 100 to the electronic device 210. The electronic device 210 may provide the user with result information (e.g., walking ability information, exercise ability information, or exercise posture evaluation information) derived by analyzing the control result and/or the sensor data through the GUI screen.

Figure 7:
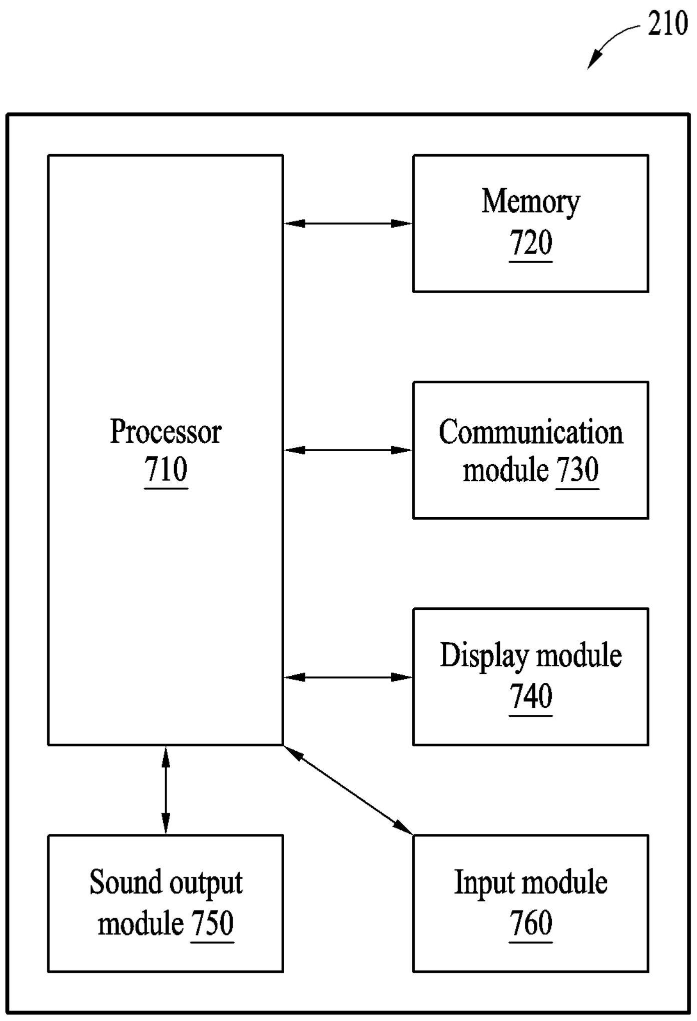
FIG. 7 is a diagram illustrating a configuration of an electronic device according to an example embodiment.

FIG. 7 is a diagram illustrating a configuration of an electronic device according to an embodiment.

Referring to FIG. 7, the electronic device 210 may include a processor 710, a memory 720, a communication module 730, a display module 740, a sound output module 750, and an input module 760. In an embodiment, at least one (e.g., the sound output module 750) of these components may be omitted from the electronic device 210, or one or more other components (e.g., a sensor module, a haptic module, and a battery) may be added to the electronic device 210.

The processor 710 may control at least one other component (e.g., a hardware or software component) of the electronic device 210, and may perform a variety of data processing or computation. According to an embodiment, as at least part of data processing or computation, the processor 710 may store instructions or data received from another component (e.g., the communication module 730) in the memory 720, process the instructions or data stored in the memory 720, and store result data in the memory 720.

In an embodiment, the processor 710 may include a main processor (e.g., a CPU or an AP) or an auxiliary processor (e.g., a GPU, an NPU, an ISP, a sensor hub processor, or a CP) that is operable independently of or in conjunction with the main processor.

The memory 720 may store a variety of data used by at least one component (e.g., the processor 710 or the communication module 730) of the electronic device 210. The data may include, for example, a program (e.g., an application) and input data or output data for instructions related thereto. The memory 720 may include at least one instruction executable by the processor 710. The memory 720 may include a volatile memory or a non-volatile memory.

The communication module 730 may support establishing a direct (e.g., wired) communication channel or a wireless communication channel between the electronic device 210 and another electronic device (e.g., the wearable device 100, the other wearable device 220, or the server 230) and performing communication via the established communication channel. The communication module 730 may include a communication circuit configured to perform a communication function. The communication module 730 may include one or more CPs that are operable independently of the processor 710 (e.g., an AP) and that support a direct (e.g., wired) communication or a wireless communication. According to an embodiment, the communication module 730, comprising communication circuitry, may include a wireless communication module configured to perform wireless communication (e.g., a Bluetooth communication module, a cellular communication module, a Wi-Fi communication module, or a GNSS communication module) or a wired communication module (e.g., a LAN communication module or a PLC module). For example, the communication module 730 may transmit a control instruction to the wearable device 100 and receive, from the wearable device 100, at least one of sensor data including body motion information of the user who is wearing the wearable device 100, state data of the wearable device 100, or control result data corresponding to the control instruction.

The display module 740 may visually provide information to the outside (e.g., the user) of the electronic device 210. The display module 740 may include, for example, a liquid-crystal display (LCD) or organic light-emitting diode (OLED) display, a hologram device, or a projector device. The display module 740 may further include a control circuit configured to control the driving of a display. In an embodiment, the display module 740 may further include a touch sensor set to sense a touch or a pressure sensor set to sense the intensity of a force generated by the touch. The display module 740 may output a user interface screen for controlling the wearable device 100 or providing a variety of information (e.g., exercise evaluation information and setting information of the wearable device 100).

The sound output module 750 may output a sound signal to the outside of the electronic device 210. The sound output module 750 may include a speaker configured to play back a guiding sound signal (e.g., an operation start sound or an operation error alarm), music content, or a guiding voice based on the state of the wearable device 100. For example, when it is determined that the wearable apparatus/device 100 is not normally worn on the body of the user, the sound output module 750 may output a guiding voice for informing the user is wearing the wearable apparatus/device 100 abnormally or for guiding the user to wear the wearable apparatus 100/device normally.

The input module 760 may receive a command or data to be used by a component (e.g., the processor 710) of the electronic device 210, from the outside (e.g., the user) of the electronic device 210. The input module 760 may include an input component circuit and may receive a user input. The input module 760 may include, for example, a touch recognition circuit for recognizing a touch on a key (e.g., a button) and/or a screen.

Figure 8:
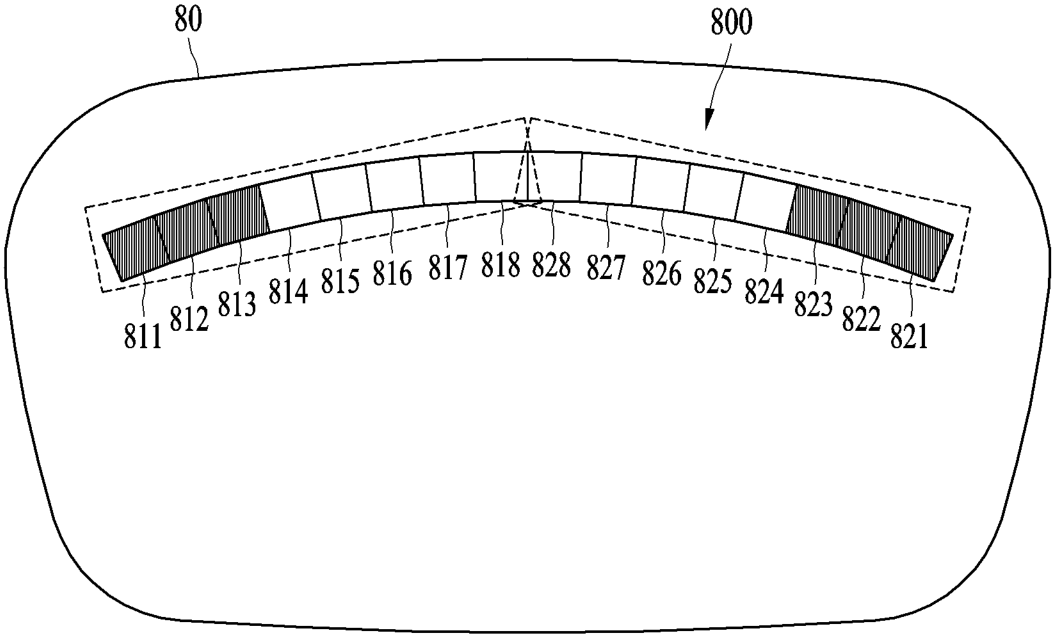
FIG. 8 is a diagram illustrating a lighting module included in a wearable device according to an example embodiment.

FIG. 8 is a diagram illustrating a lighting module included in a wearable device according to an embodiment.

In an embodiment, a wearable device (e.g., the wearable device 100 of FIG. 1) may include a lighting module 800 (e.g., the lighting module 85 of FIG. 3 or the lighting module 560 of FIG. 5) configured to emit light to the outside using a plurality of LED lamps under the control of a control module (e.g., the control module 510 of FIG. 5). The lighting module 800 may be disposed on the outer surface of the base body 80. The control module may blink the LED lamps included in the lighting module 800 based on a control signal. More specifically, the control module may transmit the control signal to the lighting module 800. The lighting module 800 may generate a current signal (or voltage signal) based on the control signal received from the control module, and turn on or off the LED lamps by supplying the generated current signal (or voltage signal) to the LED lamps.

In an embodiment, the lighting module 800 may include a preset number of LED lamps. For example, referring to FIG. 8, the lighting module 800 may include "16" LED lamps 811 to 818 and 821 to 828. The lighting module 800 may include "8" LED lamps 811 to 818 disposed on a first side (e.g., left side) and "8" LED lamps 821 to 828 disposed on a second side (e.g., right side) opposite to the first side. FIG. 8 shows an example in which three LED lamps 811, 812, and 813 from the left among the LED lamps 811 to 818 on the first side blink, and three LED lamps 821, 822, and 823 from the right among the LED lamps 821 to 828 on the second side blink. Hereinafter, for ease of description, it will be described that the lighting module 800 may include "8" LED lamps 811 to 818 disposed on the left side and "8" LED lamps 821 to 828 disposed on the right side.

In an embodiment, the control module may detect a start of exercise of the user. For example, the control module may detect a start of exercise of the user through an electronic device (e.g., the electronic device 210 of FIG. 2) capable of communicating with the wearable device. The electronic device may receive sensor data obtained by sensors (e.g., an angle sensor, an IMU, an acceleration sensor, etc.) provided in the wearable device from the wearable device, and detect the start of exercise of the user based on the received sensor data. As another example, the electronic device may receive sensor data obtained by sensors (e.g., a heart rate sensor, etc.) provided in another wearable device (e.g., the other wearable device 220) from the other wearable device, and detect the start of exercise of the user based on the received sensor data. When the start of exercise of the user is detected, the electronic device may transmit the start of exercise of the user to the wearable device.

When the start of exercise of the user is detected, the control module may select LED lamps to be blinked from the plurality of LED lamps included in the lighting module 800 based on an exercise intensity of the wearable device. The control module may blink the LED lamps selected from the plurality of LED lamps included in the lighting module 800 and may not blink the remaining LED maps while an exercise state of the user continues.

The user may execute a program (e.g., an application) in the electronic device to control the wearable device and adjust an exercise intensity of the wearable device through the corresponding program. For example, the wearable device may preset "5" levels of exercise intensity. The wearable device may hinder a body motion of the user or provide resistance to a body motion of the user by applying a resistance force generated by a driving module (e.g., the driving module 120 of FIG. 1) to the body of the user. The wearable device may increase the resistance force applied to the body of the user as the exercise intensity level increases.

In an embodiment, the control module may change the number of LED lamps to be selected from the plurality of LED lamps included in the lighting module 800 based on a change in the exercise intensity of the wearable device. The control module may increase the number of LED lamps to be selected from the plurality of LED lamps based on an increase in the exercise intensity of the wearable device. The control module may decrease the number of LED lamps to be selected from the plurality of LED lamps based on a decrease in the exercise intensity of the wearable device. Here, an increase in the exercise intensity may indicate the exercise intensity level increases, and a decrease in the exercise intensity may indicate the exercise intensity level decreases.

For example, when the exercise intensity level of the wearable device is determined to be a first level which is the lowest level, the control module may select and blink "4" LED lamps 811, 812, 813, and 814 from the left among the LED lamps 811 to 818 disposed on the left side and "4" LED lamps 821, 822, 823, and 824 from the right among the LED lamps 821 to 828 disposed on the right side. As the exercise intensity level of the wearable device increases by "1" level, the control module may additionally select and blink "1" LED lamp from the LED lamps 811 to 818 disposed on the left side sequentially from the left and additionally select and blink "1" LED lamp from the LED lamps 821 to 828 disposed on the right side sequentially from the right. For example, when the exercise intensity level of the wearable device is determined to be a fifth level which is the highest level, the control module may select and blink all the LED lamps 811 to 818 disposed on the left side and the LED lamps 821 to 828 disposed on the right side. In other words, the control module may change a light emission length by changing the number of LED lamps to be selected as the exercise intensity of the wearable device changes, and visually inform the user of the change in the exercise intensity of the wearable device according to the change in the light emission length. Here, the light emission length is the length of a region in which light is emitted within the lighting module 800, and may be proportional to the number of blinking LED lamps.

In an embodiment, when the start of exercise of the user is detected, the control module may determine a blinking period of the selected some LED lamps based on a walking speed of the user. The control module may decrease the blinking period of the selected LED lamps based on an increase in the walking speed of the user, and increase the blinking period of the selected LED lamps based on a decrease in the walking speed of the user. Herein, the blinking period of the LED lamps may be a time required for all selected LED lamps to change from a turned-off state to a turned-on state and then to the turned-off state again. The control module may blink the selected LED lamps among the plurality of LED lamps for the determined blinking period. For example, the control module may blink the selected LED lamps in a manner of turning on the selected LED lamps at the same time and turning off the selected LED lamps at the same time. As another example, the control module may blink the selected LED lamps in a manner of turning on the selected LED lamps sequentially and turning off the selected LED lamps sequentially.

The control module may calculate the walking speed of the user when the start of exercise of the user is detected. For example, the electronic device may receive sensor data obtained by a sensor (e.g., an acceleration sensor) provided in the wearable device from the wearable device, and calculate the walking speed of the user based on the received sensor data. The electronic device may transmit the calculated walking speed of the user to the wearable device.

Figure 9:
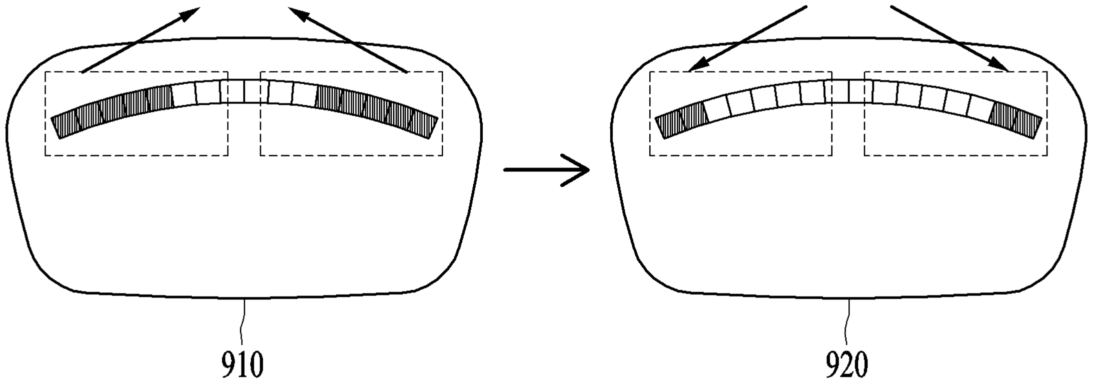
FIG. 9 is a diagram illustrating a process of blinking a plurality of light-emitting diode (LED) lamps in an exercise mode by a wearable device according to an example embodiment.

FIG. 9 is a diagram illustrating a process of blinking a plurality of LED lamps in an exercise mode by a wearable device according to an embodiment.

In an embodiment, a control module of a wearable device may detect a start of exercise of a user. The control module may detect an end of exercise of the user. The control module may operate the wearable device in an exercise mode from the start of exercise of the user to the end of the exercise of the user. The exercise mode may include a boost mode and an aqua mode, but is not limited thereto. The boost mode may be a mode for assisting the user with walking by applying an assistance force generated by the driving module to the body of the user. In other words, in the boost mode, the rotation direction of a hip joint of the user may coincide with the rotation direction of an actuator. The aqua mode may be a mode for hindering a body motion of the user or providing resistance to a body motion of the user by applying a resistance force generated by the driving module to the body of the user. In other words, in the aqua mode, the rotation direction of a hip joint of the user may be opposite to the rotation direction of an actuator. The user may select the exercise mode of the wearable device as a boost mode or an aqua mode through a program for controlling the wearable device, the program executed on the electronic device. Hereinafter, a process of blinking the plurality of LED lamps in the exercise mode by the control module will be described.

In an embodiment, when a start of exercise of the user is detected, the control module may select first LED lamps from the LED lamps 811 to 818 disposed on the left side and select second LED lamps from the LED lamps 821 to 828 disposed on the right side (e.g., see FIG. 8). The control module may turn on and off the selected first LED lamps sequentially during a blinking period determined based on a walking speed of the user. Similarly, the control module may turn on and off the selected second LED lamps sequentially during the determined blinking period. More specifically, the control module may blink the first LED lamps and the second LED lamps in a blinking pattern 910 that turns on the first LED lamps sequentially for a preset first period of time and turns on the second LED lamps sequentially for the same period of time. In addition, the control module may blink the first LED lamps and the second LED lamps in a blinking pattern 920 that turns off the first LED lamps sequentially for a preset second period of time and turns off the second LED lamps sequentially for the same period of time.

In an embodiment, the control module may set a plurality of speed sections and set a blinking period corresponding to each of the plurality of set speed sections. The control module may determine the blinking period of the selected LED lamps to be a blinking period corresponding to a speed section to which the walking speed of the user falls within among the plurality of set speed sections. For example, the control module may set "3" speed sections (e.g., a first speed section, a second speed section, and a third speed section). The first speed section may have a range that is less than or equal to a first threshold speed, the second speed section may have a range that exceeds the first threshold speed and is less than or equal to a second threshold speed, and the third speed section may have a range that exceeds the second threshold speed. The control module may decrease the set blinking period in the order of the first speed section, the second speed section, and the third speed section. As an example, the control module may blink the selected LED lamps for a first blinking period corresponding to the first speed section when the walking speed of the user falls within the first speed section among the set "3" speed sections. For example, the control module may turn on all of the selected first LED lamps for 1000 milliseconds (ms) and turn on all of the selected second LED lamps for 1000 ms. At this time, the control module may turn on the first LED lamps from the leftmost LED lamp 811 sequentially to the right and turn on the second LED lamps from the rightmost LED lamp 821 sequentially to the left. The control module may turn off the turned-on first LED lamps for 1333 ms, and similarly turn off all the turned-on second LED lamps for the same period of time of 1333 ms. In this case, the control module may turn off the first LED lamps sequentially from the rightmost LED lamp to the left and turn off the second LED lamps sequentially from the leftmost LED lamp to the right. The control module may repeatedly perform the above operation while the walking speed of the user falls within the first speed section. In other words, the blinking period for the first speed section may be 2333 ms (1000 ms+1333 ms). The blinking period for the second speed section may be 1499 ms (666 ms+833 ms), and the blinking period for the third speed section may be 833 ms (333 ms+500 ms).

In an embodiment, the control module of the wearable device may adjust the color of the LED lamps. Each LED lamp may include a red LED, a green LED, and a blue LED, and emit light of a desired color by combining lights emitted from the respective LEDs. As described above, the wearable device may operate in one of a boost mode and an aqua mode, and the control module may set a blinking color of the LED lamps corresponding to each exercise mode (e.g., the boost mode or the aqua mode). The control module may turn on the selected LED lamps in a blinking color corresponding to an exercise mode in which the wearable device operates. For example, when the wearable device operates in the boost mode, the control module may turn on the selected LED lamps in green corresponding to the boost mode. As another example, when the wearable device operates in the aqua mode, the control module may turn on the selected LED lamps in purple corresponding to the aqua mode.

Figure 10:
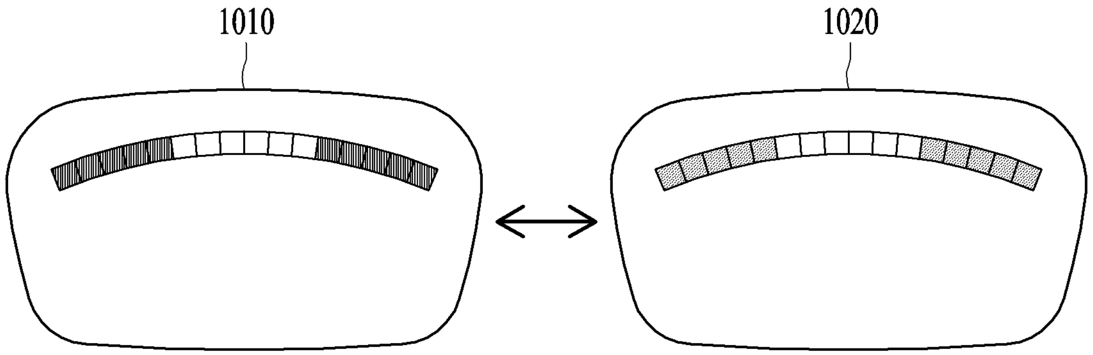
FIG. 10 is a diagram illustrating a process of changing a blinking color of an LED module based on heart rate information of a user by a wearable device according to an example embodiment.

FIG. 10 is a diagram illustrating a process of changing a blinking color of an LED module based on heart rate information of a user by a wearable device according to an embodiment.

In an embodiment, a wearable device may obtain heart rate information of a user. For example, the wearable device may obtain the heart rate information of the user through a sensor (e.g., a heart rate sensor) provided in the wearable device. As another example, the wearable device may obtain the heart rate information of the user from another wearable device (e.g., the smart watch 224 of FIG. 2) connected to the wearable device.

In an embodiment, a control module of the wearable device may determine a blinking color of selected LED lamps based on the heart rate information of the user. The control module may determine whether the heart rate of the user falls within a stable section or a risky section.

When the heart rate of the user falls within the stable section, the control module may blink the selected LED lamps in a blinking color corresponding to an exercise mode (e.g., a boost mode or an aqua mode) in which the wearable device operates, as in example 1010. For example, when the heart rate of the user falls within the stable section and the wearable device operates in the boost mode, the control module may blink the selected LED lamps in a color different from the blinking color corresponding to the exercise mode (e.g., the boost mode or the aqua mode), as in example 1020. When the heart rate of the user falls within the risky section, the wearable device may determine the blinking color of the selected LED lamps to be a blinking color corresponding to the risky section. For example, the blinking color corresponding to the risky section may be red, but is not limited thereto. For example, the control module may set a heart rate of 0 to 100 beats per minute (bpm) as the stable section and set a heart rate exceeding 100 bpm as the risky section.

In an embodiment, when the heart rate of the user changes from the stable section to the risky section, the control module may change the blinking color of the selected LED lamps to a color corresponding to the risky section. When the heart rate of the user changes from the risky section to the stable section, the control module may change the blinking color of the selected LED lamps to the blinking color corresponding to the original exercise mode. At this time, in changing the blinking color of the selected LED lamps, the control module may change the blinking color of the selected LED lamps for 500 ms. For example, the control module may change the blinking color of selected first LED lamps sequentially from the leftmost LED lamp 811 to the right for 500 ms and change the blinking color of selected second LED lamps sequentially from the rightmost LED lamp 821 to the left for 500 ms. At this time, the control module may change the blinking color of the first LED lamps and the second LED lamps at a constant speed. Changing the blinking color at a constant speed may indicate that a time interval from the time of changing the color of one LED lamp to the time of changing the color of the next LED lamp is constant.

Furthermore, in the above example, it is described that the control module classifies the heart rate section into "2" sections, but the control module may generate "3" or more heart rate sections. Hereinafter, an example in which the control module generates "3" heart rate sections will be described. The control module may set a first section, a second section, and a third section as the heart rate sections of a user. When the heart rate of the user falls within the first section (corresponding to the stable section), the control module may blink the selected LED lamps in a blinking color corresponding to an exercise mode (e.g., a boost mode or an aqua mode) in which the wearable device operates. When the heart rate of the user falls within the second section, the control module may blink the selected LED lamps in a color (e.g., yellow) different from the blinking color corresponding to the exercise mode (e.g., the boost mode or the aqua mode). When the heart rate of the user falls within the third section (corresponding to the risky section), the control module may blink the selected LED lamps in a color (e.g., red) different from the blinking color corresponding to the exercise mode (e.g., the boost mode or the aqua mode). In other words, when the heart rate of the user enters the second section before entering the third section (the risky section), the control module may blink the LED lamps in yellow so that the user may take precautions before a risky situation occurs.

Figure 11:
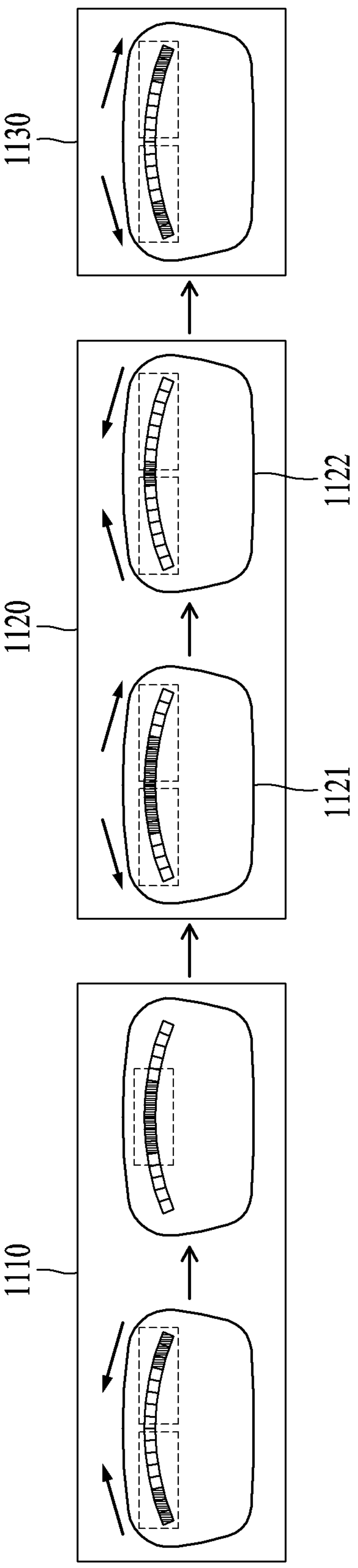
FIG. 11 is a diagram illustrating a blinking pattern of LED lamps that is output by a wearable device when a suspension of exercise of a user is detected according to an example embodiment.

FIG. 11 is a diagram illustrating a blinking pattern of LED lamps that is output by a wearable device when a suspension of exercise of a user is detected according to an embodiment.

In an embodiment, a control module of a wearable device may detect a suspension of exercise of a user. For example, the control module may detect a suspension of exercise of the user when a walking speed of the user is greater than or equal to "0" and less than a threshold speed. The threshold speed may be 3 kilometers per hour (km/h), but is not limited thereto. The suspension of exercise of the user may be understood as the same as the user's stopping walking. When a suspension of exercise of the user is detected, the control module may blink a plurality of LED lamps in a first pattern indicating a suspension of exercise of the user and iteratively blink the plurality of LED lamps in a second pattern indicating a continuation of the suspension of exercise of the user until a resumption of exercise of the user is detected after the plurality of LED lamps are blinked in the first pattern. When a resumption of exercise of the user is detected, the control module may blink the plurality of LED lamps in a third pattern indicating a resumption of exercise of the user. The first pattern, the second pattern, and the third pattern may be different blinking patterns. For example, in changing the blinking pattern of the LED lamps from one blinking pattern to another blinking pattern, the control module may change the blinking pattern naturally by blinking the plurality of LED lamps in an intermediate blinking pattern in the middle of moving from one blinking pattern to another blinking pattern.

In an embodiment, when a suspension of exercise of the user is detected, the control module may blink a plurality of LED lamps included in a lighting module in a first pattern 1110 indicating a suspension of exercise of the user. The control module may blink the plurality of LED lamps once in the first pattern 1110. The first pattern 1110 is a pattern that moves one area, in which a preset number of (e.g., "3") LED lamps among the LED lamps 811 to 818 disposed on the left side are turned on, from the left to the center (e.g., the LED lamp 818 of FIG. 8) for 500 ms and moves a lighting area, in which a preset number of (e.g., "3") LED lamps among the LED lamps 821 to 828 disposed on the right side are turned on, from the right to the center for the same period of time. For example, the control module may firstly turn on the LED lamps 811, 812, and 813 and the LED lamps 821, 822, and 823, secondly turn on the LED lamps 812, 813, and 814 and the LED lamps 822, 823, and 824, and finally turn on the LED lamps 816, 817, and 818 and the LED lamps 826, 827, and 828.

After blinking the plurality of LED lamps in the first pattern 1110, the control module may iteratively blink the plurality of LED lamps in a second pattern 1120 indicating a continuation of the suspension of exercise of the user until a resumption of exercise of the user is detected. The second pattern 1120 may include a blinking pattern 1121 that expands a lighting area by turning on sequentially to the left for 1000 ms the LED lamps 811 to 818 disposed on the left side from the LED lamp 818 disposed at the center to a third LED lamp (e.g., the LED lamp 814) of a preset point and turning on sequentially to the right for the same period of time the LED lamps 821 to 828 disposed on the right side from the LED lamp 828 disposed at the center to a fourth LED lamp (e.g., the LED lamp 824) of a preset point, and a blinking pattern 1122 that reduces a lighting area by turning off sequentially to the right for 666 ms the LED lamps 811 to 818 disposed on the left side from the third LED lamp to the LED lamp 818 disposed at the center and turning off sequentially to the left for the same period of time the LED lamps 821 to 828 disposed on the right side from the fourth LED lamp to the LED lamp 828 disposed at the center.

When a resumption of exercise of the user is detected, the control module may blink the plurality of LED lamps in a third pattern 1130 indicating a resumption of exercise of the user. The control module may blink the plurality of LED lamps once in the third pattern 1130. The third pattern 1130 is a pattern that moves one lighting area, in which a preset number of (e.g., "3") LED lamps among the LED lamps 811 to 818 disposed on the left side are turned on, from the center to the left for 500 ms and moves one lighting area, in which a preset number of (e.g., "3") LED lamps among the LED lamps 821 to 828 disposed on the right side are turned on, from the center to the right for the same period of time. For example, the control module may firstly turn on the LED lamps 818, 817, and 816 and the LED lamps 828, 827, and 826, secondly turn on the LED lamps 817, 816, and 815 and the LED lamps 827, 826, and 825, and finally turn on the LED lamps 813, 812, and 811 and the LED lamps 823, 822, and 821.

Figure 12:
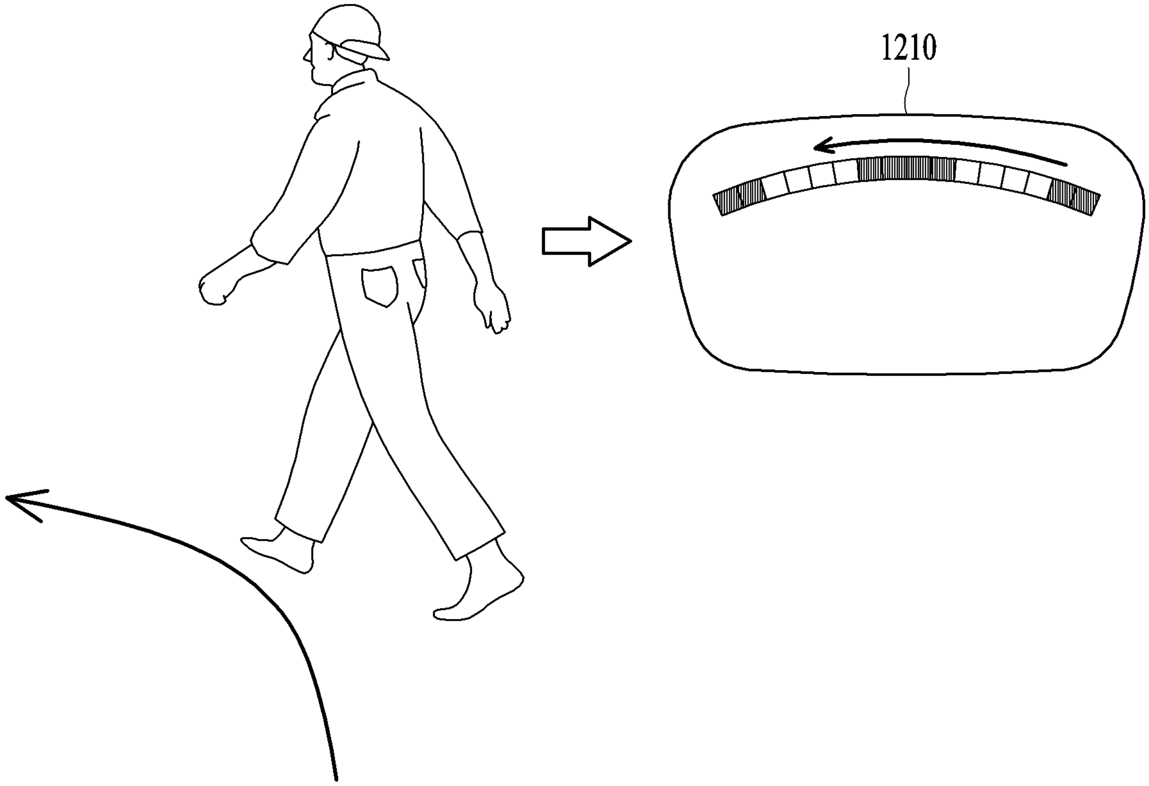
FIG. 12 is a diagram illustrating a process of determining a blinking pattern of LED lamps by a wearable device when a moving direction of a user changes according to an example embodiment.

FIG. 12 is a diagram illustrating a process of determining a blinking pattern of LED lamps by a wearable device when a moving direction of a user changes according to an embodiment.

In an embodiment, a control module of a wearable device may detect a change in a moving direction of a user. For example, the wearable device may include an IMU sensor. The IMU sensor may be a device capable of measuring the moving speed, moving direction, gravity, and acceleration of a moving object. The wearable device may include a plurality of IMU sensors, and may detect a rotation of the body of the user wearing the wearable device using the plurality of IMU sensors and determine a direction in which the user rotates. For example, when it is determined that the body of the user rotates in the left direction, the control module may determine that the moving direction of the user changes to the left direction. Similarly, when it is determined that the body of the user rotates in the right direction, the control module may determine that the moving direction of the user changes to the right direction.

In an embodiment, when a change in the moving direction of the user is detected, the control module may blink the plurality of LED lamps included in the lighting module in a blinking pattern indicating a new moving direction while the change in the moving direction is detected. Here, the blinking pattern indicating a new moving direction may be a pattern that moves one or more lighting areas in which a preset number of LED lamps are turned on in the new moving direction.

For example, when a change in the moving direction of the user to the right direction is detected, the control module may blink the plurality of LED lamps in a blinking pattern indicating the right direction while the change in the moving direction to the right direction is detected. When a change in the moving direction of the user to the left direction is detected, the control module may blink the plurality of LED lamps in a blinking pattern indicating the left direction while the change in the moving direction to the left direction is detected.

A blinking pattern 1210 indicating the left direction may be an operation of generating one or more lighting areas in which a first number of (e.g., "4") LED lamps among the plurality of LED lamps 811 to 818 and 821 to 828 included in the lighting module are turned on and causing the lighting areas to be extinct while moving the one or more lighting areas from the right to the left. For example, the control module may generate one lighting area by performing an operation of turning on the LED lamps 821, 822, and 823 sequentially from the right LED lamp 821. Then, the control module may move the generated lighting area to the left by performing a first operation of turning on the LED lamps 823, 824 and 825, a second operation of turning on the LED lamps 824, 825 and 826, and a final operation of turning on the LED lamps 813, 812 and 811. Then, the control module may cause the one lighting area to be extinct by performing an operation of turning off the LED lamps 813, 812, and 811 sequentially from the right LED lamp 813. For example, the control module may additionally generate and move one area every 500 ms.

Figure 13:
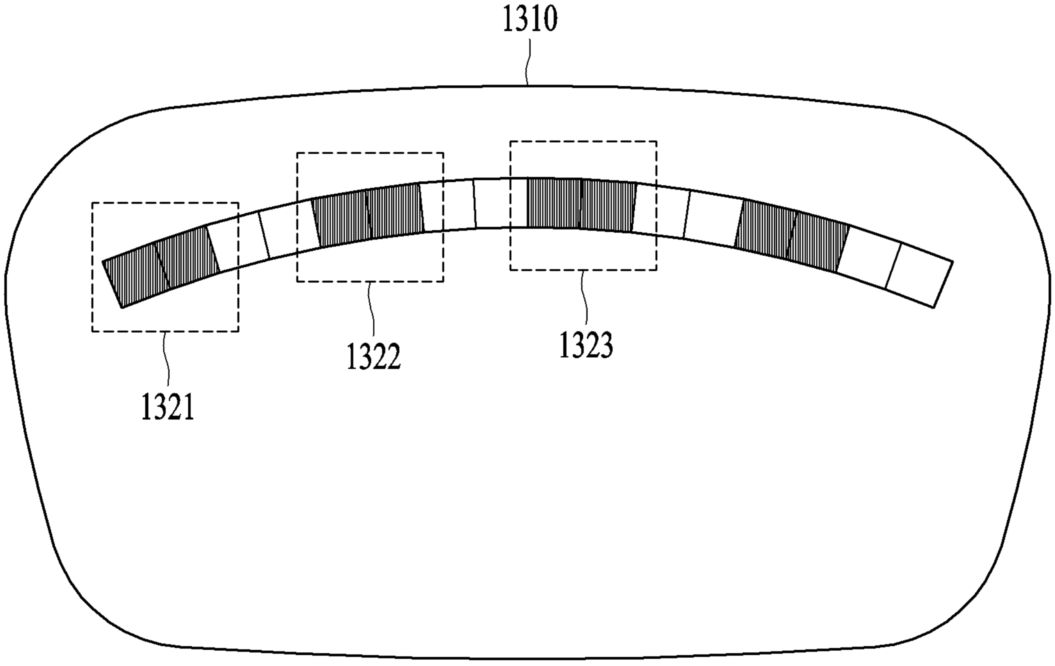
FIG. 13 is a diagram illustrating a process of determining a blinking pattern and blinking color of a plurality of LED lamps by a wearable device when a user needs exercise coaching or a defect occurring in the wearable device is detected according to an example embodiment.

FIG. 13 is a diagram illustrating a process of determining a blinking pattern and blinking color of a plurality of LED lamps by a wearable device when a user needs exercise coaching or a defect occurring in the wearable device is detected according to an embodiment.

In an embodiment, a control module of a wearable device may determine whether a user needs exercise coaching. The electronic device may determine at least one of a posture of the user and a left and right balance of the user using sensor data received from the wearable device. For example, the electronic device may receive data about a load distribution of both feet of the user wearing the wearable device and determine the posture of the user based on the received load distribution of both feet of the user. As another example, the electronic device may determine the left and right balance of the user based on a load distribution of the right foot of the user and a load distribution of the left foot of the user. The electronic device may determine whether the user needs exercise coaching based on the posture or left and right balance of the user. For example, when the posture of the user is inappropriate, the electronic device may determine that the user needs exercise coaching. As another example, when the left and right balance of the user is inharmonious, the electronic device may determine that the user needs exercise coaching. The electronic device may transmit whether the user needs exercise coaching to the wearable device.

When it is determined that the user needs exercise coaching, the control module of the wearable device may change a blinking pattern and blinking color of LED lamps while it is determined that exercise coaching is needed. When it is determined that the user needs exercise coaching, the control module may blink a plurality of LED lamps included in a lighting module in a fourth pattern 1310. The fourth pattern 1310 may be a pattern that generates lighting areas (e.g., a lighting area 1321, a lighting area 1322, and a lighting area 1323) in which a second number of (e.g., "2") LED lamps among the plurality of LED lamps 811 to 818 and 821 to 828 included in the lighting module are turned on and causing the lighting areas to be extinct while moving the lighting areas in one direction (e.g., the right direction or the left direction). Here, the second number (e.g., "2") may be smaller than a first number (e.g., "4"), which is the number of LED lamps turned on in one lighting area appearing in a blinking pattern indicating a moving direction. As an example, the control module may generate one lighting area by turning on the LED lamps 811 and 812 sequentially from the left LED lamp 811 for 300 ms, and move the generated lighting area in the right direction for 2500 ms. The control module may move the lighting area in the right direction by performing a first operation of turning on the LED lamps 812 and 813, a second operation of turning on the LED lamps 813 and 814, and a final operation of turning on the LED lamps 822 and 821. Then, the control module may cause the generated lighting area to be extinct by performing an operation of turning off the LED lamps 822 and 821 sequentially from the left LED lamp 822 for 300 ms. The control module may additionally generate one lighting area every 500 ms. When it is determined that the user needs exercise coaching, the control module may blink the plurality of LED lamps in a first color. For example, the first color may be yellow, but is not limited thereto. The first color may be a blinking color different from blinking colors corresponding to exercise modes.

In an embodiment, the control module of the wearable device may detect whether the wearable device has a defect. For example, the control module may detect a low battery of the wearable device or an abnormality of at least one sensor provided in the wearable device. When it is detected the wearable device has a defect, the control module may change a blinking pattern and blinking color of LED lamps while the defect of the wearable device continues. When it is detected the wearable device has a defect, the control module may blink the plurality of LED lamps included in the lighting module in the fourth pattern 1310. In addition, when it is detected the wearable device has a defect, the control module may blink the plurality of LED lamps in a second color. For example, the second color may be red, but is not limited thereto. The second color may be a blinking color different from the blinking colors corresponding to the exercise modes and may be a blinking color different from the first color.

Figure 14:
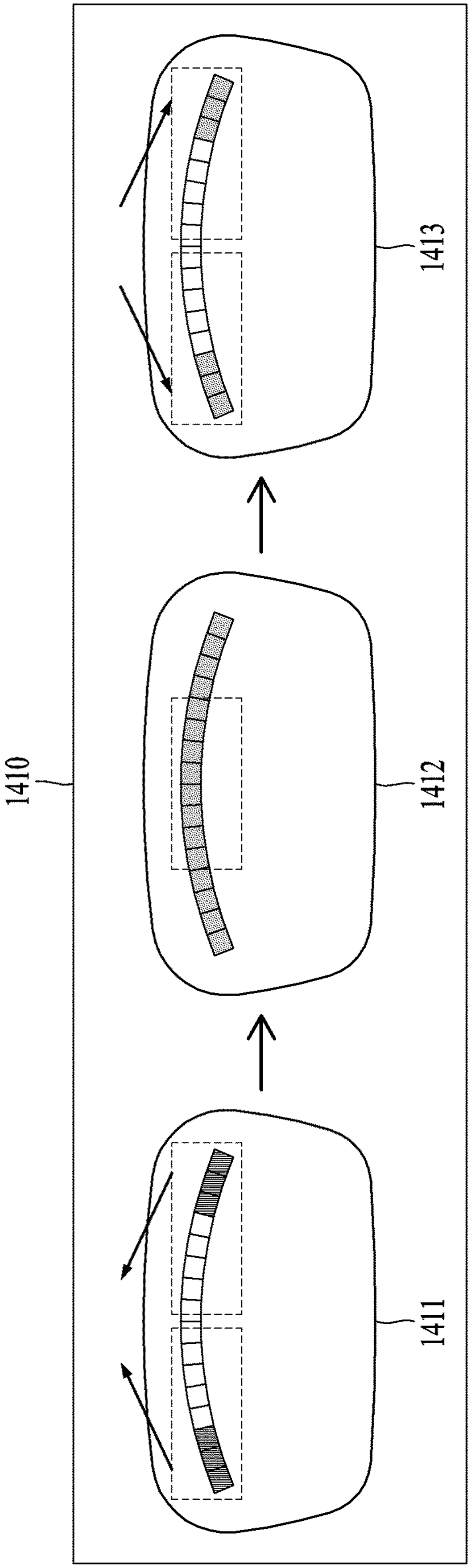
FIG. 14 is a diagram illustrating a blinking pattern of LED lamps that is output by a wearable device when an end of exercise of a user is detected according to an example embodiment.

FIG. 14 is a diagram illustrating a blinking pattern of LED lamps that is output by a wearable device when an end of exercise of a user is detected according to an embodiment.

In an embodiment, a control module of a wearable device may detect an end of exercise of a user. For example, the control module may determine that the user ends the exercise when the suspension of exercise of the user continues for a preset time (e.g., 60 seconds). When an end of exercise of the user is detected, the control module may blink a plurality of LED lamps included in a lighting module once in a fifth pattern 1410. The control module may blink the plurality of LED lamps in a third color while blinking the plurality of LED lamps in the fifth pattern 1410. For example, the third color may be white, but is not limited thereto.

The third color may be a blinking color different from the blinking colors corresponding to the exercise modes and may be a blinking color different from the first color and the second color. The fifth pattern 1410 may include a blinking pattern 1411 that expands a lighting area by turning on sequentially to the right for 400 ms the LED lamps 811 to 818 disposed on the left side from the LED lamp 811 to the LED lamp 818 and turning on sequentially to the left for the same period of time the LED lamps 821 to 828 disposed on the right side from the LED lamp 821 to the LED lamp 828, a blinking pattern 1412 that changes for 400 ms a blinking color of the plurality of turned-on LED lamps 811 to 818 and 821 to 828 from a color corresponding to a mode in which the wearable device operates to the third color, and a blinking pattern 1413 that reduces a lighting area by turning off sequentially to the left for 833 ms the LED lamps 811 to 818 disposed on the left side from the LED lamp 818 to the LED lamp 811 and turning off sequentially to the right for the same period of time the LED lamps 821 to 828 disposed on the right side from the LED lamp 828 to the LED lamp 821.

Figure 15:
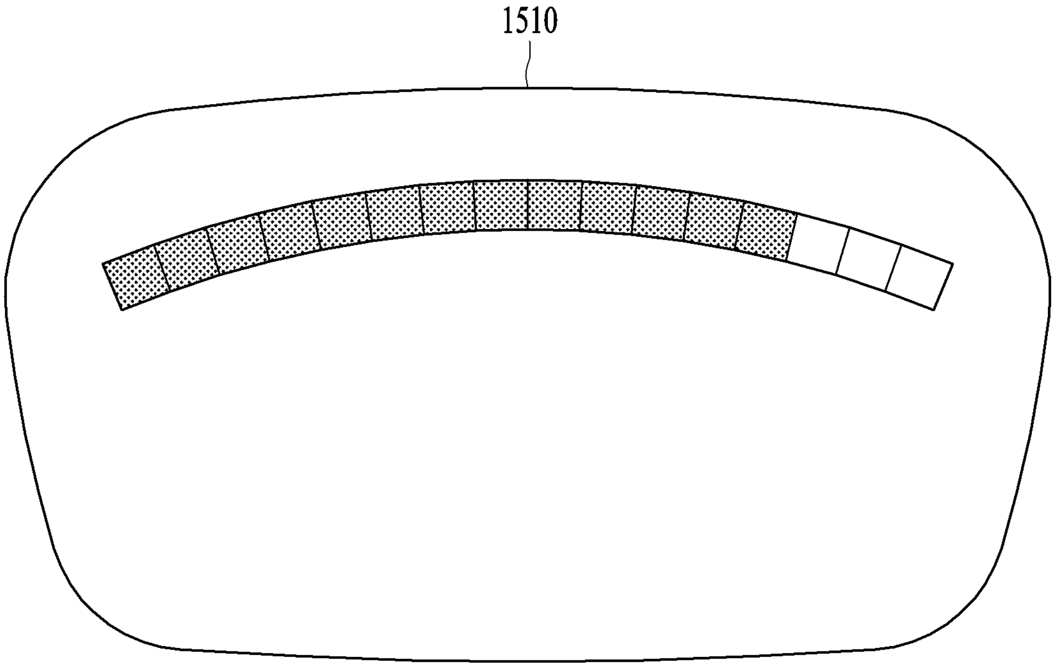
FIG. 15 is a diagram illustrating a process of representing a state of charge of a battery using LED lamps by a wearable device while charging the battery is performed according to an example embodiment.

FIG. 15 is a diagram illustrating a process of representing a state of charge of a battery using LED lamps by a wearable device while charging the battery is performed according to an embodiment.

Each embodiment herein may be used in combination with any other embodiment(s) described herein.

In an embodiment, a control module of a wearable device may represent a state of charge of a battery of the wearable device using a plurality of LED lamps included in a lighting module. The control module may represent the state of charge of the battery of the wearable device based on turning on the plurality of LED lamps while charging the battery of the wearable device is performed.

In an embodiment, when charging the battery of the wearable device is initiated, the control module may determine the number of LED lamps to be turned on based on a ratio of a current state of charge of a battery to an overall battery capacity of the wearable device, and continuously turn on the determined number of LED lamps while charging the battery continues. The control module may determine the number of LED lamps to be turned on to be the greatest possible number while the ratio of the number of LED lamps to be turned on to the total number of LED lamps (e.g., “16”) is less than or equal to the ratio of the current state of charge of the battery to the battery capacity.

For example, when the ratio of the current state of charge of the battery to the overall battery capacity of the wearable device is 78%, the control module may turn on “12” LED lamps among the total of “16” LED lamps, as in example 1510. When charging the battery of the wearable device is initiated, the control module may expand a lighting area by turning on the “12” lamps from the leftmost LED lamp 811 sequentially to the right for 1000 ms, and visually represent the state of charge of the battery through the lighting area corresponding to the turned-on “12” LED lamps. In addition, the control module may reduce a lighting brightness of each of the LED lamps belonging to the lighting area by 70% for 500 ms after 3000 ms.

Figure 16:
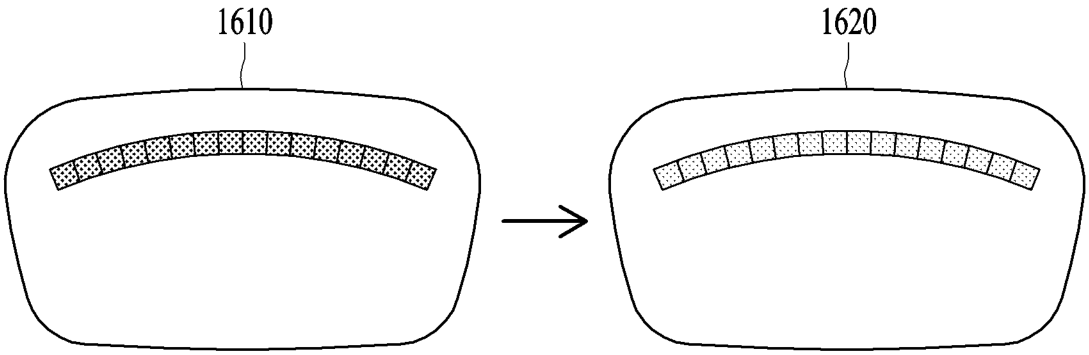
FIG. 16 is a diagram illustrating a process of representing that charging a battery of a wearable device is completed using LED lamps by the wearable device according to an example embodiment.

FIG. 16 is a diagram illustrating a process of representing that charging a battery of a wearable device is completed using LED lamps by the wearable device according to an embodiment.

In an embodiment, when charging a battery of a wearable device is completed, a control module of the wearable device may visualize and transmit information indicating that charging the battery is completed to the user by adjusting a lighting brightness of a plurality of LED lamps. When charging the battery of the wearable device is completed, the control module may turn on all the plurality of LED lamps and change a lighting brightness of the plurality of LED lamps at a preset time interval. For example, when charging the battery of the wearable device is completed, the control module may change the lighting brightness of each of the plurality of LED lamps 811 to 818 and 821 to 828 from 70% of the maximum brightness, as in example 1610, to the maximum brightness for 233 ms, as in example 1620, and change the lighting brightness of the plurality of LED lamps from the maximum brightness to 70% of the maximum brightness for 433 ms, as in example 1610. The control module may adjust the lighting brightness of the plurality of LED lamps by repeatedly performing the above operation, and visualize the completion of charging the battery of the wearable device based on changing the lighting brightness.

In an embodiment, when charging the battery of the wearable device is completed, the control module may perform adjusting the lighting brightness of the plurality of LED lamps for a preset time (e.g., 5 seconds), and turn on the plurality of LED lamps at one fixed lighting brightness after the preset time. For example, the control module may minimize or reduce battery consumption by dimming the plurality of LED lamps to 70% of the maximum brightness.

Figure 17:
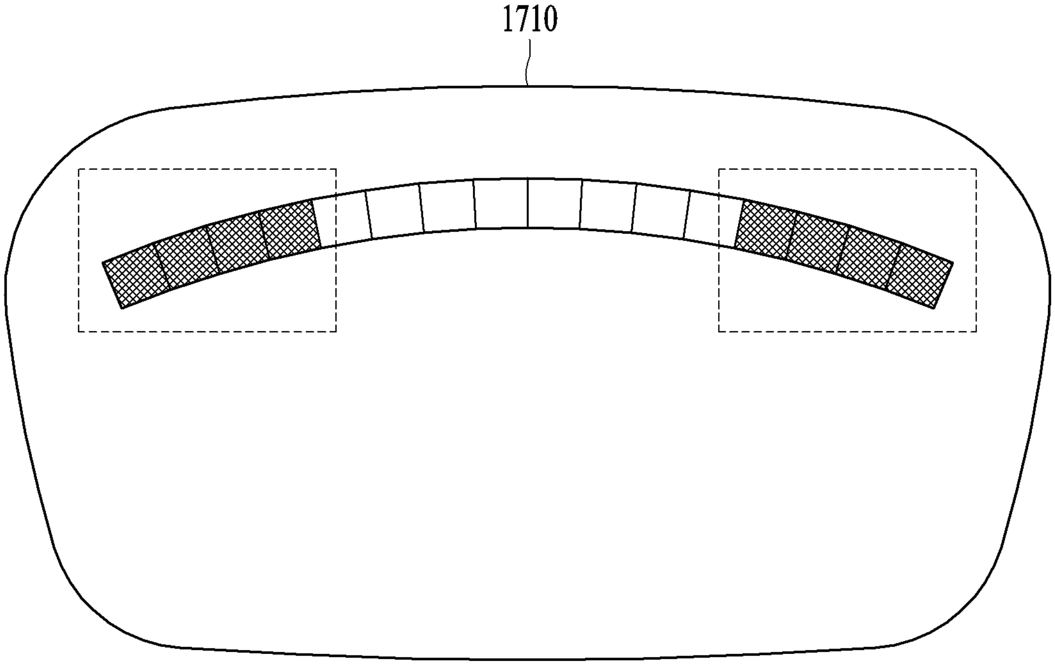
FIG. 17 is a diagram illustrating a process of representing a charging error or excessive usage using LED lamps by a wearable device according to an example embodiment.

FIG. 17 is a diagram illustrating a process of representing a charging error or excessive usage using LED lamps by a wearable device according to an embodiment.

In an embodiment, a control module, comprising processing circuitry, of a wearable device may determine whether a charging error occurs while charging a battery of the wearable device continues. For example, the control module may determine that a charging error occurs when a charging cable connected to the wearable device is not suitable or when a connection with the charging cable is not suitable. However, a method of determining whether a charging error occurs by the control module is not limited thereto. When a charging error occurs while charging the battery of the wearable device continues, the control module may blink LED lamps in a blinking pattern indicating the charging error and a blinking color corresponding to the charging error. For example, the control module may select a preset number of (e.g., “3”) LED lamps (e.g., the LED lamps 811 to 813) from the left among the LED lamps 811 to 818 disposed on the left side and a preset number of (e.g., “3”) LED lamps (e.g., the LED lamps 821 to 823) from the right among the LED lamps 821 to 828 disposed on the right side and blink the selected LED lamps (e.g., the LED lamps 811 to 813 and 821 to 823) in a fourth color. For example, the fourth color may be yellow, but is not limited thereto. The control module may repeatedly blink the selected LED lamps (e.g., the LED lamps 811 to 813 and 821 to 823) in a blinking pattern 1710 that turns on the selected LED lamps for 333 ms and turns off the selected LED lamps for 333 ms, until the charging error is resolved.

In an embodiment, the control module may determine whether a recommended usage is exceeded while charging the battery of the wearable device continues. A usage recommended for a preset time (e.g., 1 day) (a recommended usage) may be preset for the wearable device, and the control module may determine the total usage of the wearable device and calculate the remaining usage. The control module may calculate the remaining usage by subtracting the total usage from the recommended usage. For example, the recommended usage for the wearable device may be set to a threshold time (e.g., 4 hours), and the control module may determine that the wearable device has no remaining usage and is used in excess of the recommended usage when the wearable device is used more than the threshold time (e.g., 4 hours). For example, the control module may calculate the remaining usage of the wearable device by subtracting the total time of usage from the threshold time. The control module may blink the plurality of LED lamps in the blinking pattern 1710 described above, when the remaining usage is less than the threshold usage while charging the battery of the wearable device continues. At this time, the control module may blink the LED lamps in a fifth color. For example, the fifth color may be red, but is not limited thereto.

Figure 18:
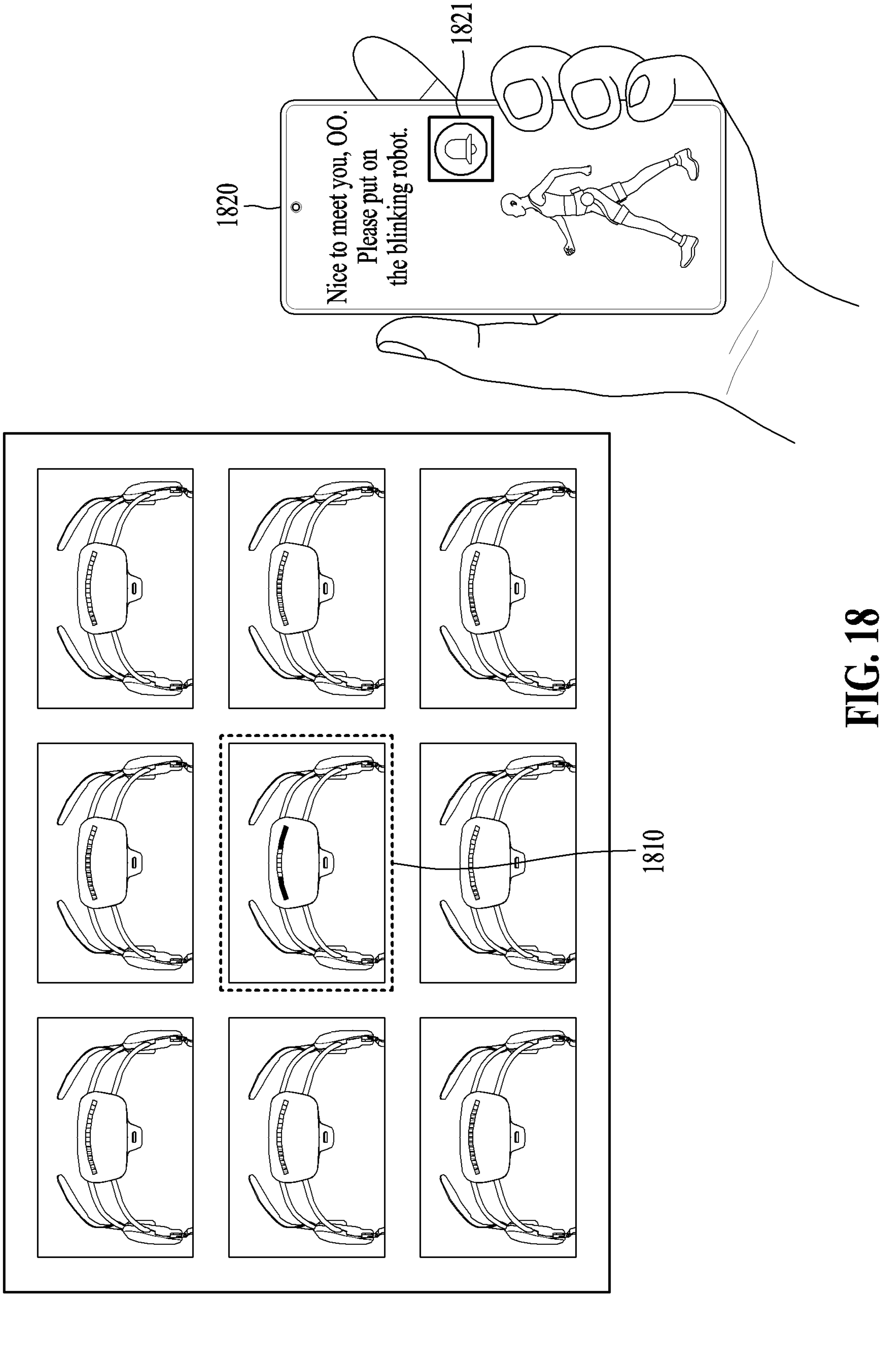
FIG. 18 is a diagram illustrating a process of connecting a wearable device to an electronic device according to an example embodiment.

FIG. 18 is a diagram illustrating a process of connecting a wearable device to an electronic device according to an embodiment.

In an embodiment, a wearable device 1810 may be connected with an electronic device 1820 (e.g., the electronic device 200 of FIG. 2) through wireless communication (e.g., Bluetooth™ communication). Hereinafter, a process in which the wearable device 1810 and the electronic device 1820 are connected to each other through wireless communication in a state in which the wearable device 1810 and the electronic device 1820 are paired will be described.

A user may execute a program on the electronic device 1820 and call a wearable device (e.g., the wearable device 1810) paired with the electronic device 1820 through the program. The program executed on the electronic device 1820 may provide a graphical user interface (GUI) 1821 for calling a wearable device to be connected with the electronic device 1820 through wireless communication.

In an embodiment, the electronic device 1820 may call a target wearable device (e.g., the wearable device 1810) to be connected with the electronic device 1820 through wireless communication, when a user input of selecting the GUI 1821 is received from the user.

More specifically, the electronic device 1820 may identify one or more wearable devices paired with the electronic device 1820 when the user input of selecting the GUI 1821 is received from the user. The electronic device 1820 may transmit an investigation signal to each of the identified one or more wearable devices and receive, from each of the wearable devices, wearing information of the wearable device including battery information, usage information, and size information. In other words, each of the identified one or more wearable devices may transmit the wearing information of the wearable device to the electronic device 1820 when the investigation signal is received from the electronic device 1820. The electronic device 1820 may determine the target wearable device (e.g., the wearable device 1810) to be connected with the electronic device through wireless communication among the identified one or more wearable devices based on the received wearing information. The electronic device 1820 may transmit a call signal to the determined target wearable device (e.g., the wearable device 1810). When the call signal is received from the electronic device 1820, the target wearable device (e.g., the wearable device 1810) may be changed to a call state and blink a plurality of LED lamps included in a lighting module in a blinking pattern indicating a call state. The target wearable device may blink the plurality of LED lamps in the blinking pattern indicating a call state, thereby allowing a user to easily identify a wearable device to be connected with the electronic device 1820 through wireless communication. The blinking pattern indicating a call state will be described in detail with reference to FIG. 19. "Based on" as used herein covers based at least on.

In an embodiment, the electronic device 1820 may determine the target wearable device to be connected with the electronic device 1820 through wireless communication based on the wearing information received from each wearable device among the one or more wearable devices paired with the electronic device 1820.

In an embodiment, the electronic device may determine whether each of the identified one or more wearable devices satisfies a first condition regarding whether a ratio of a state of charge of a battery to a battery capacity is greater than or equal to a threshold ratio, a second condition regarding whether a remaining usage is greater than or equal to a threshold usage, and a third condition regarding whether the size of a wearable device to be worn by a user matches the size of the wearable device. For example, the threshold ratio may be 20%, but is not limited thereto, and the threshold usage may be 2 hours, but is not limited thereto. The electronic device may obtain information about the size of the wearable device to be worn by the user by searching a wearable device wearing history of the user. The electronic device may determine one wearable device satisfying all of the first condition, the second condition, and the third condition among the identified one or more wearable devices to be the target wearable device.

In another embodiment, the electronic device may calculate a wearing score corresponding to each of the identified one or more wearable devices and determine a wearable device having the highest calculated wearing score as the target wearable device. The electronic device may calculate, for one wearable device, a first score corresponding to battery information, a second score corresponding to usage information, and a third score corresponding to size information, and calculate a wearing score of the wearable device with the sum of the first score, the second score, and the third score. For example, the electronic device may calculate a higher first score as the ratio of the state of charge of a battery to the battery capacity of the wearable device increases, calculate a higher second score as the remaining usage increases, and calculate a higher third score as the similarity between the size of the wearable device and the size of the wearable device to be worn by the user increases. Furthermore, the electronic device may calculate the wearing score of the wearable device with a weighted sum of the first score, the second score, and the third score. For example, the electronic device may increase weights to be added to the first score, the second score, and the third score in that order.

Figure 19:
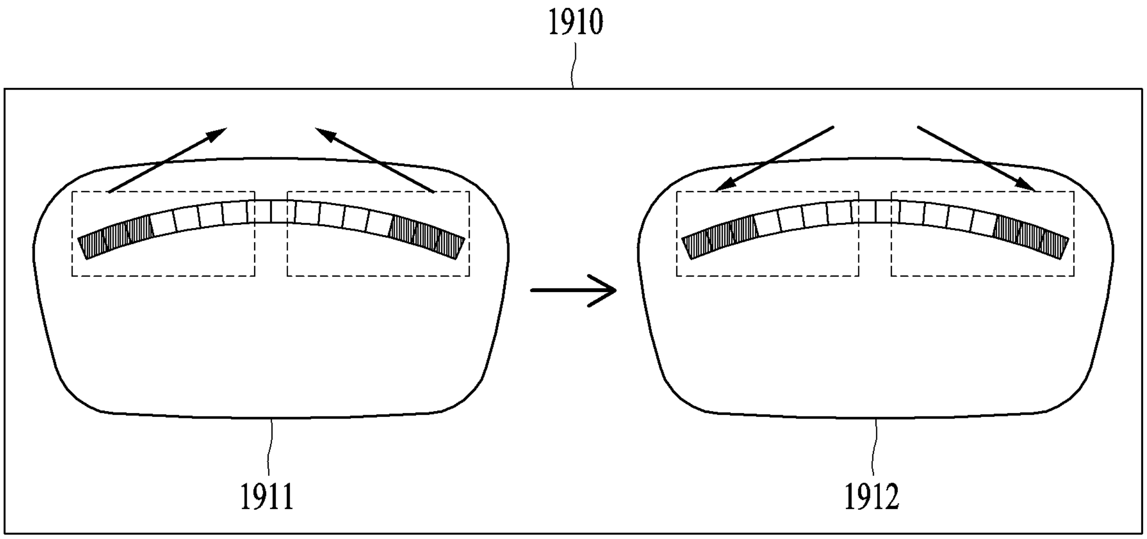
FIG. 19 is a diagram illustrating a blinking pattern of LED lamps that is output by a wearable device when the wearable device is in a call state according to an example embodiment.

FIG. 19 is a diagram illustrating a blinking pattern of LED lamps that is output by a wearable device when the wearable device is in a call state according to an embodiment.

In an embodiment, an electronic device may call a target wearable device to be connected with the electronic device through wireless communication. The target wearable device may blink a plurality of LED lamps in a sixth pattern 1910 indicating a call state. In this case, the target wearable device may blink the plurality of LED lamps in a sixth color. For example, the sixth color may be cyan, but is not limited thereto.

The sixth pattern 1910 may include a blinking pattern 1911 that moves a lighting area, in which a preset number of (e.g., "3") LED lamps among the LED lamps 811 to 818 disposed on the left side are turned on, from the left to the center for 300 ms and moves a lighting area, in which a preset number of (e.g., "3") LED lamps among the LED lamps 821 to 828 disposed on the right side are turned on, from the right to the center for the same period of time, and a blinking pattern 1912 that moves a lighting area, in which a preset number of (e.g., "3") LED lamps among the LED lamps 811 to 818 disposed on the left side are turned on, from the center to the left for 350 ms and moves a lighting area, in which a preset number of (e.g., "3") LED lamps among the LED lamps 821 to 828 disposed on the right side are turned on, from the center to the right for the same period of time.

Figure 20:
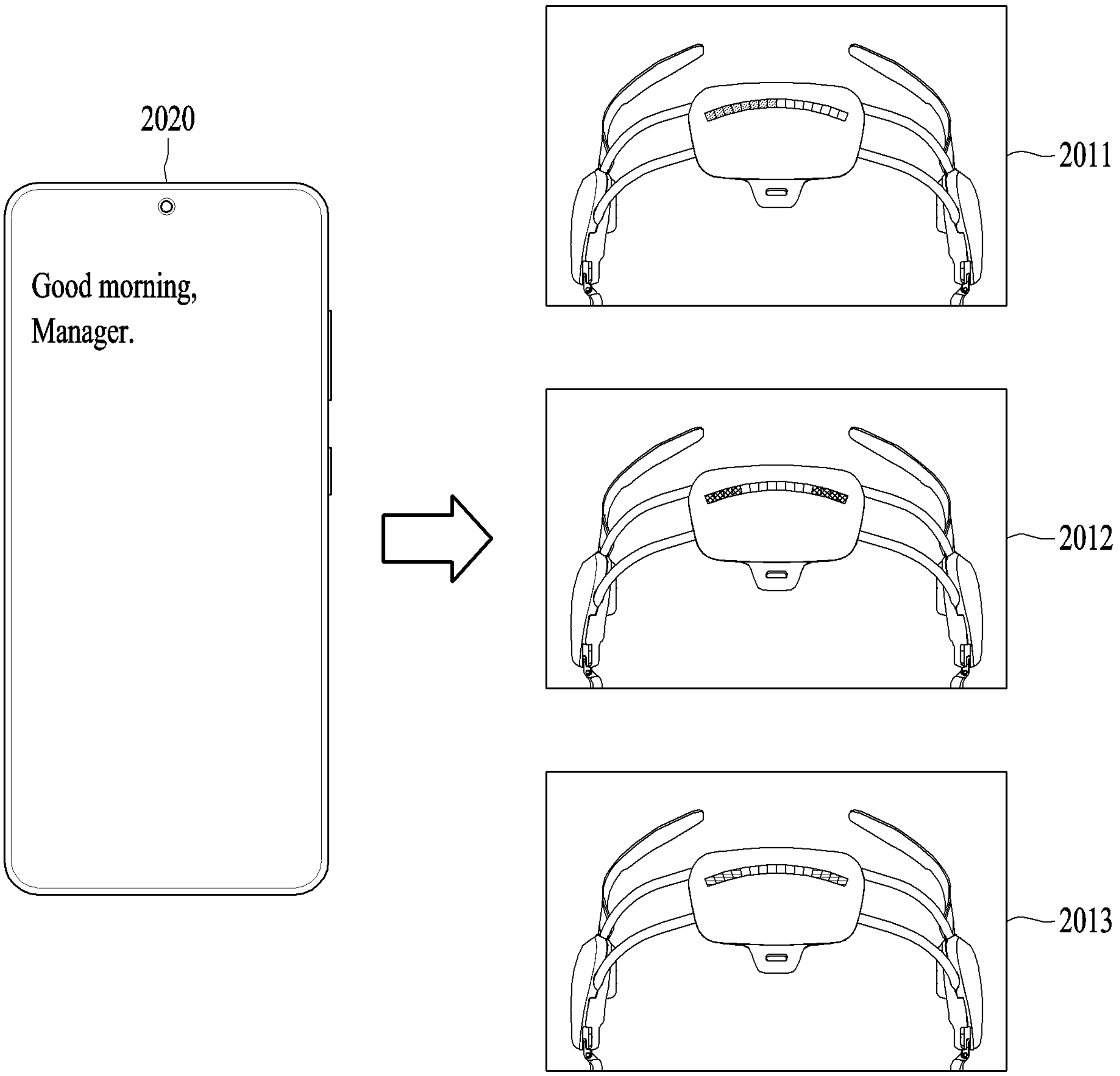
FIG. 20 is a diagram illustrating a process of verifying a state of a wearable device by an electronic device according to an example embodiment.

FIG. 20 is a diagram illustrating a process of verifying a state of a wearable device by an electronic device according to an embodiment.

In an embodiment, a user may execute a program on an electronic device 2020 and verify states of a plurality of wearable devices at once through the program. For example, the user may access the program with manager authority, and the electronic device 2020 may transmit a management signal to verify states of a plurality of wearable devices (e.g., a wearable device 2011, a wearable device 2012, and a wearable device 2013) disposed near the electronic device 2020. Hereinafter, it is assumed that each of the plurality of wearable devices is in a state in which charging a battery is performed.

In an embodiment, a control module, comprising processing circuitry, of a wearable device (e.g., the wearable device 2011, the wearable device 2012, or the wearable device 2013) may determine whether a charging error occurs in the wearable device and whether a remaining usage of the wearable device is less than a threshold usage, when the management signal is received from the electronic device 2020 while charging the battery of the wearable device is performed. The control module of the wearable device 2011 may represent a state of charge of the battery of the wearable device 2011 by blinking a plurality of LED lamps, when a charging error does not occur in the wearable device and the remaining usage of the wearable device 2011 is greater than or equal to the threshold usage. When a charging error occurs in the wearable device 2012, the control module of the wearable device 2012 may blink a plurality of LED lamps in the blinking pattern 1710 of FIG. 17 and a fourth color. When the remaining usage of the wearable device 2013 is less than the threshold usage, the control module of the wearable device 2013 may blink a plurality of LED lamps in the blinking pattern 1710 of FIG. 17 and a fifth color.

Figure 21:
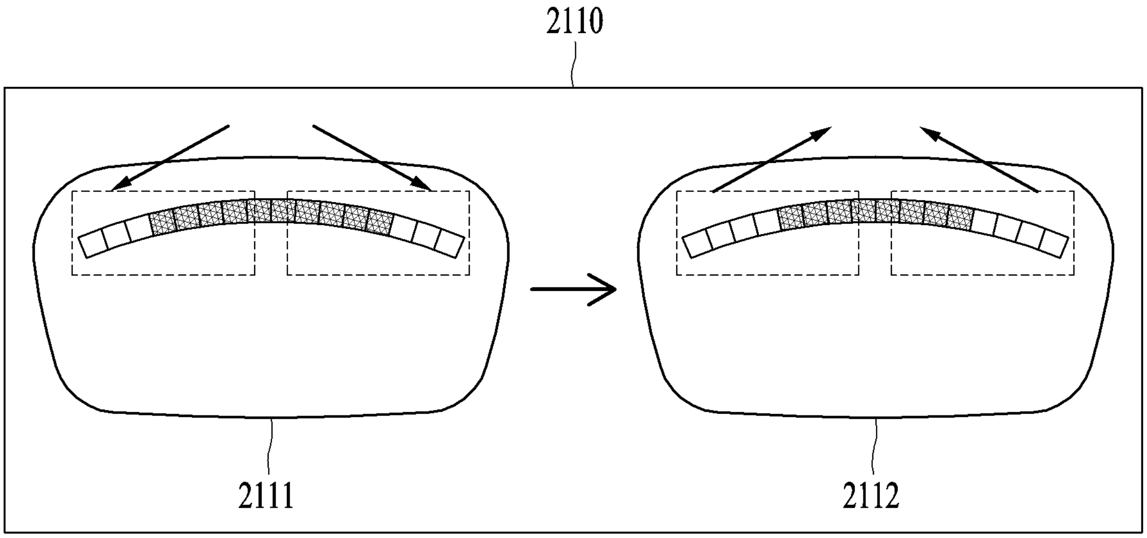
FIGS. 21 and 22 are diagrams illustrating blinking patterns of LED lamps in a process of connecting wireless communication by a wearable device according to an example embodiment.
Figure 22:
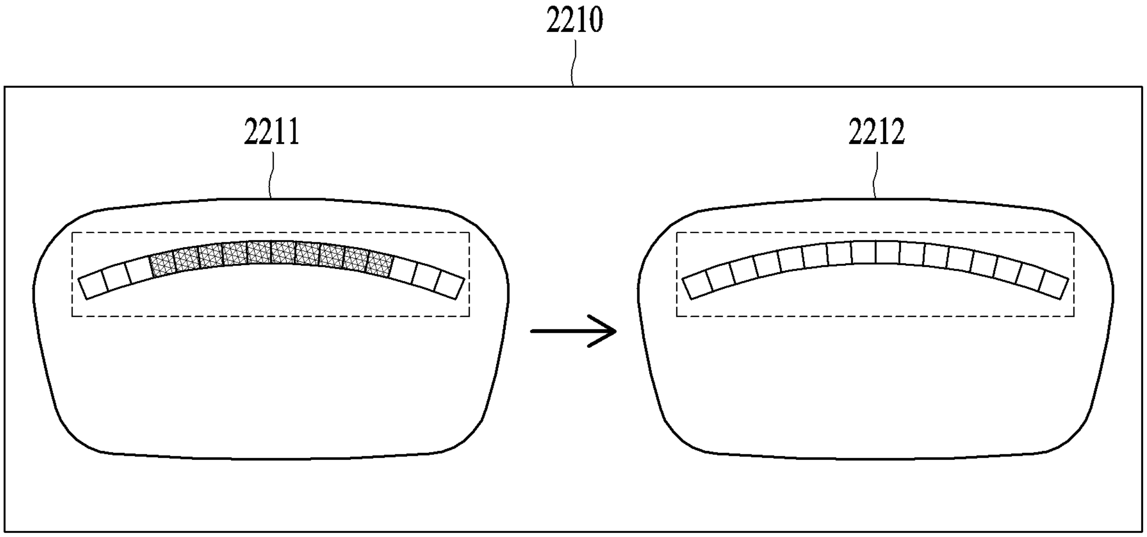

FIGS. 21 and 22 are diagrams illustrating blinking patterns of LED lamps in a process of connecting wireless communication by a wearable device according to an embodiment.

According to an embodiment, a wearable device may turn on a wireless communication function to be connected with an electronic device through wireless communication. A user may turn on the wireless communication function of the wearable device by pressing a button (not shown) disposed on the wearable device for a preset period of time or longer.

FIG. 21 illustrates a blinking pattern in which a control module of the wearable device blinks a plurality of LED lamps when the wireless communication function is turned on. When the wireless communication function is turned on, the control module may repeatedly blink the plurality of LED lamps in a seventh pattern 2110 until wireless communication is connected. The seventh pattern 2110 may include a blinking pattern 2111 that expands a lighting area by turning on sequentially to the left the LED lamps 811 to 818 disposed on the left side from the rightmost LED lamp 818 to a fifth LED lamp (e.g., the LED lamp 813) of a preset point and turning on sequentially to the right for the same period of time the LED lamps 821 to 828 disposed on the right side from the leftmost LED lamp 828 to a sixth LED lamp (e.g., the LED lamp 823) of a preset point, and a blinking pattern 2112 that turns off sequentially to the right the LED lamps 811 to 818 disposed on the left side from the fifth LED lamp to the LED lamp 818 disposed at the center and turns off sequentially to the left for the same period of time the LED lamps 821 to 828 disposed on the right side from the sixth LED lamp to the LED lamp 828 disposed at the center.

FIG. 22 illustrates an eighth pattern 2210 in which the control module of the wearable device blinks the plurality of LED lamps when an error occurs in the process of connecting wireless communication. The control module may determine that an error occurs in the process of connecting wireless communication when an error occurs in the wireless communication function or when an error occurs in the connection of wireless communication between a device (e.g., an electronic device) designated by a user and the wearable device. The control module may repeatedly blink the plurality of LED lamps in the eighth pattern 2210 from the time when an error occurs in the process of connecting wireless communication to the time when the error is resolved. The eighth pattern 2210 may include a blinking pattern 2211 that turns on all the LED lamps 811 to 818 disposed on the left side for 333 ms from the rightmost LED lamp 818 to a seventh LED lamp (e.g., the LED lamp 814) of a preset point and turns on all the LED lamps 821 to 828 disposed on the right side for the same period of time of 333 ms from the leftmost LED lamp 828 to an eighth LED lamp (e.g., the LED lamp 824) of a preset point, and a blinking pattern 2212 that turns off the turned-on LED lamps for 500 ms.

Figure 23:
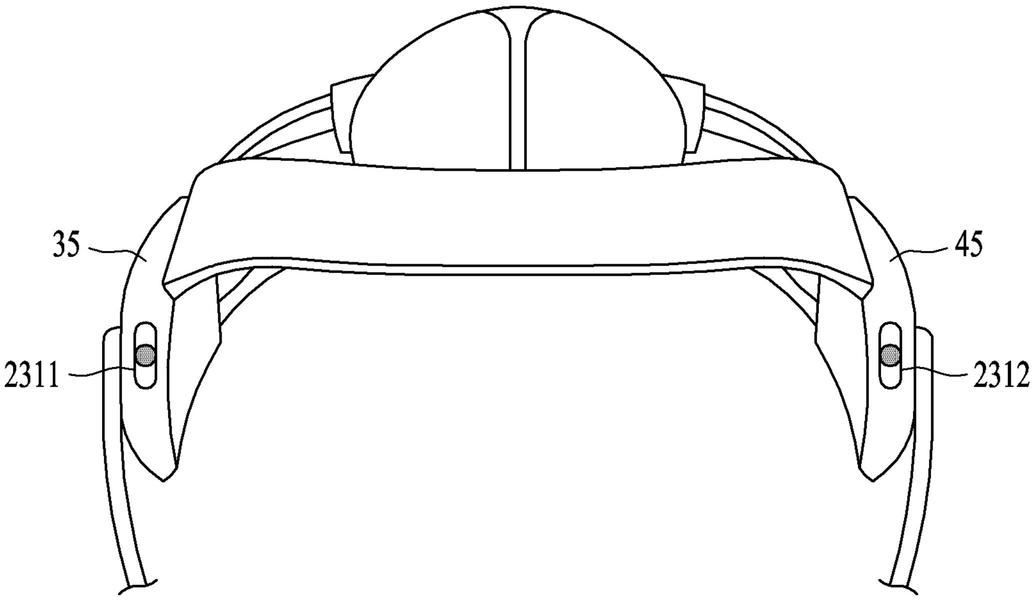
FIG. 23 is a diagram illustrating a plurality of lighting modules included in a wearable device according to an example embodiment.

FIG. 23 is a diagram illustrating a plurality of lighting modules included in a wearable device according to an embodiment.

In an embodiment, a wearable device may include a plurality of lighting modules, each comprising at least one light source. The wearable device may include a rear lighting module (e.g., the lighting module 85 of FIG. 3) disposed on the outer surface of a base body (e.g., the base body 80 of FIG. 3), and front lighting modules 2311 and 2312 disposed on the respective outer surfaces of the driving modules 35 and 45. The lighting modules described with reference to FIGS. 8 to 22 may be rear lighting modules. Each of the front lighting modules 2311 and 2312 may include one LED lamp. Each of the front lighting modules 2311 and 2312 may provide a user with information about a state of a wearable device through a blinking color and blinking pattern of the LED lamp.

A control module of the wearable device may blink the LED lamp included in each of the front lighting modules 2311 and 2312 in the same seventh color when the wearable device is in a state of waiting for connection of wireless communication as a wireless communication function is turned on or a state of having an error in the process of connecting wireless communication. The control module may determine the state of the wearable device by setting a lighting time for turning on the LED lamp and an extinguishing time for turning off the LED lamp differently for each of the lighting modules 2311 and 2312. For example, when the wearable device is in a state of waiting for connection of wireless communication as the wireless communication function is turned on, the control module may turn on the LED lamp included in each of the front lighting modules 2311 and 2312 for 800 ms and turn off the LED lamp for 1000 ms. As another example, when the wearable device is in a state of having an error in the process of connecting wireless communication, the control module may turn on the LED lamp included in each of the front lighting modules 2311 and 2312 for 300 ms and turn off the LED lamp for 400 ms.

It should be appreciated that various embodiments of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, “A or B”, “at least one of A and B”, “at least one of A or B”, “A, B or C”, “at least one of A, B and C”, and “at least one of A, B, or C”, each of which may include any one of the items listed together in the corresponding one of the phrases, or all possible combinations thereof. Terms such as “first”, “second”, or “first” or “second” may simply be used to distinguish the component from other components in question, and do not limit the components in other aspects (e.g., importance or order). It is to be understood that if an element (e.g., a first element) is referred to, with or without the term “operatively” or “communicatively,” as “coupled with,” “coupled to,” “connected with,” or “connected to” another element (e.g., a second element), the element may be coupled with the other element directly (e.g., by wire), wirelessly, or via at least a third element(s).

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC). Thus, each "module" herein may comprise circuitry.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, or computer storage medium or device capable of providing instructions or data to or being interpreted by the processing device. The software also may be distributed over network-coupled computer systems so that the software is stored and executed in a distributed fashion. The software and data may be stored by one or more non-transitory computer-readable recording mediums. Embodiments as set forth herein may be implemented as software including one or more instructions that are stored in a storage medium (e.g., the memory 514) that is readable by a machine. For example, a processor of the machine may invoke at least one of the one or more instructions stored in the storage medium and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to embodiments, each component (e.g., a module or a program) of the above-described components may include a single entity or multiple entities, and some of the multiple entities may be separately disposed in different components. According to an embodiment, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A wearable device to be worn on a body of a user, the wearable device comprising:

a driving module, comprising a motor and/or circuitry, configured to generate torque to be applied to the body of the user;

a leg driving frame configured to transmit the generated torque to a leg of the user;

a thigh fastening portion, comprising a strap and/or a support, connected to the leg driving frame and configured to be connected to the leg of the user;

a sensor module, comprising a sensor, configured to obtain and/or provide sensor data comprising motion information of the leg driving frame;

a control module, comprising processing circuitry, configured to control the wearable device based on the sensor data; and a lighting module configured to emit light to the outside using a plurality of light-emitting diode (LED) lamps of the lighting module which are under a control of the control module, wherein the control module is further configured to detect a start of exercise of the user, select LED lamps to be blinked from the plurality of LED lamps included in the lighting module based on an exercise intensity of the wearable device.

2. The wearable device of claim 1, wherein the control module is further configured to increase a number of LED lamps to be selected from the plurality of LED lamps based on an increase in the exercise intensity of the wearable device, and decrease the number of LED lamps to be selected from the plurality of LED lamps based on a decrease in the exercise intensity of the wearable device.

3. The wearable device of claim 1, wherein the control module is further configured to decrease the blinking period of the selected LED lamps based on an increase in the walking speed of the user, and increase the blinking period of the selected LED lamps based on a decrease in the walking speed of the user.

4. The wearable device of claim 1, wherein the plurality of LED lamps comprise LED lamps disposed on a first side and LED lamps disposed on a second side opposite to the first side, wherein the control module is further configured to:

select first LED lamps from the LED lamps disposed on the first side and turn on and off the selected first LED lamps sequentially during the determined blinking period, and select second LED lamps from the LED lamps disposed on the second side and turn on and off the selected second LED lamps sequentially during the determined blinking period.

5. The wearable device of claim 1, wherein the control module is further configured to:

blink the selected LED lamps in a blinking color corresponding to a current exercise mode of the wearable device when a heart rate of the user falls within a predetermined section, and blink the selected LED lamps in a blinking color other than a blinking color corresponding to an exercise mode when the heart rate of the user falls within a risky section.

6. The wearable device of claim 1, wherein the control module is further configured to:

blink the plurality of LED lamps in a first pattern indicating a suspension of exercise of the user and iteratively blink the plurality of LED lamps in a second pattern indicating a continuation of the suspension of exercise of the user until a resumption of exercise of the user is detected after the plurality of LED lamps are blinked in the first pattern, when a suspension of exercise of the user is detected, and blink the plurality of LED lamps in a third pattern indicating a resumption of exercise of the user when a resumption of exercise of the user is detected, wherein the first pattern, the second pattern, and the third pattern are different blinking patterns.

7. The wearable device of claim 1, wherein the control module is further configured to blink the plurality of LED lamps in a blinking pattern indicating a new moving direction based on a change in a moving direction of the user being detected, wherein the blinking pattern indicating the new moving direction comprises a pattern that moves one or more lighting areas in which a preset number of LED lamps are turned on in the new moving direction.

8. The wearable device of claim 1, wherein the control module is further configured to:

determine a number of LED lamps to be turned on based on a ratio of a current state of charge to a battery capacity of the wearable device when charging a battery of the wearable device is initiated, and continuously turn on the determined number of LED lamps while charging the battery continues, and turn on all the plurality of LED lamps and change a lighting brightness of the plurality of LED lamps at a preset time interval, based on charging the battery of the wearable device being completed.

9. The wearable device of claim 1, wherein the control module is further configured to:

control to transmit wearing information of the wearable device comprising battery information, usage information, and size information to an electronic device paired with the wearable device, based on an investigation signal being received from the electronic device, and control to blink the plurality of LED lamps in a blinking pattern indicating a call state based on a call signal received from the electronic device.

10. The wearable device of claim 1, wherein the control module is further configured to:

determine whether a charging error occurs in the wearable device and whether a remaining usage of the wearable device is less than a threshold usage, when a management signal is received from the electronic device while charging a battery of the wearable device is performed, and represent a state of charge of a battery of the wearable device at least by blinking the plurality of LED lamps, when a charging error does not occur in the wearable device and the remaining usage of the wearable device is greater than or equal to the threshold usage.

11. An electronic device comprising:

a display; and a processor, comprising processing circuitry, configured to:

identify one or more wearable devices paired with the electronic device, control to transmit an investigation signal to the identified one or more wearable devices and receive wearing information of the one or more wearable devices comprising battery information, usage information, and size information from the one or more wearable devices, and determine one of the one or more wearable devices to be connected with the electronic device through wireless communication among the identified one or more wearable devices based on the received wearing information.

12. The electronic device of claim 11, wherein the processor is further configured to:

determine whether each of the identified one or more wearable devices satisfies a first condition regarding whether a ratio of a state of charge of a battery to a battery capacity is greater than or equal to a threshold ratio, a second condition regarding whether a remaining usage is greater than or equal to a threshold usage, and a third condition regarding whether the size of a wearable device to be worn by a user matches the size of the corresponding wearable device, and determine one of the one or more wearable devices satisfying all of the first condition, the second condition, and the third condition to be a wearable device to be connected with the electronic device via wireless communication.

13. An operating method of a wearable device, the operating method comprising:

detecting, by the wearable device, a start of exercise of a user of the wearable device; and selecting light-emitting diode (LED) lamps to be blinked from a plurality of LED lamps included in a lighting module based on an exercise intensity of the wearable device.

14. The operating method of claim 13, wherein the selecting of the LED lamps comprises:

increasing a number of LED lamps to be selected from the plurality of LED lamps based on an increase in the exercise intensity of the wearable device; and decreasing the number of LED lamps to be selected from the plurality of LED lamps based on a decrease in the exercise intensity of the wearable device.

15. The operating method of claim 13, wherein the operating method further comprising:

decreasing the blinking period of the selected LED lamps based on an increase in the walking speed of the user; and increasing the blinking period of the selected LED lamps based on a decrease in the walking speed of the user.

16. The operating method of claim 13, wherein the blinking of the selected LED lamps comprises:

blinking the selected LED lamps in a blinking color corresponding to a current exercise mode of the wearable device when a heart rate of the user falls within a predetermined section; and blinking the selected LED lamps in a blinking color other than a blinking color corresponding to an exercise mode when the heart rate of the user falls within a risky section.

17. The operating method of claim 13, further comprising:

blinking the plurality of LED lamps in a blinking pattern indicating a new moving direction while a change in a moving direction of the user is detected, when a change in the moving direction is detected, wherein the blinking pattern indicating the new moving direction is a pattern that moves one or more lighting areas in which a preset number of LED lamps are turned on in the new moving direction.

18. The operating method of claim 13, further comprising:

determining a number of LED lamps to be turned on based on a ratio of a current state of charge of a battery to a battery capacity of the wearable device when charging a battery of the wearable device is initiated, and continuously turning on the determined number of LED lamps while charging the battery continues; and turning on all the plurality of LED lamps and changing a lighting brightness of the plurality of LED lamps at a preset time interval, when charging the battery of the wearable device is completed.

19. The operating method of claim 13, further comprising:

transmitting wearing information of the wearable device comprising battery information, usage information, and size information to an electronic device paired with the wearable device, when an investigation signal is received from the electronic device; and blinking the plurality of LED lamps in a blinking pattern indicating a call state when a call signal is received from the electronic device.

20. An operating method of an electronic device, the operating method comprising:

identifying at least one wearable device paired with the electronic device;

transmitting an investigation signal to the identified at least one wearable device and receiving wearing information of the at least one wearable device comprising battery information, usage information, and size information from the at least one wearable device; and determining one wearable device to be connected with the electronic device via wireless communication among the identified at least one wearable device based on the received wearing information.

* * * * *